US010841323B2

(12) United States Patent
Sinha et al.

(10) Patent No.: US 10,841,323 B2
(45) Date of Patent: Nov. 17, 2020

(54) DETECTING ROBOTIC INTERNET ACTIVITY ACROSS DOMAINS UTILIZING ONE-CLASS AND DOMAIN ADAPTATION MACHINE-LEARNING MODELS

(71) Applicant: Adobe Inc., San Jose, CA (US)

(72) Inventors: Ritwik Sinha, Kolkata (IN); Vishwa Vinay, Bangalore (IN); Sunny Dhamnani, Bangalore (IN); Margarita Savova, Jersey City, NJ (US); Lilly Kumari, Patna (IN); David Weinstein, Rockville Centre, NY (US)

(73) Assignee: ADOBE INC., San Jose, CA (US)

( * ) Notice: Subject to any disclaimer, the term of this patent is extended or adjusted under 35 U.S.C. 154(b) by 171 days.

(21) Appl. No.: 15/982,393

(22) Filed: May 17, 2018

(65) Prior Publication Data

US 2019/0356684 A1    Nov. 21, 2019

(51) Int. Cl.
*H04L 29/06* (2006.01)
*H04L 12/24* (2006.01)
*H04L 12/26* (2006.01)

(52) U.S. Cl.
CPC .......... *H04L 63/1425* (2013.01); *H04L 41/16* (2013.01); *H04L 43/16* (2013.01); *H04L 63/1458* (2013.01)

(58) Field of Classification Search
CPC .................................................. H04L 63/1425
USPC ......................................................... 726/22
See application file for complete search history.

(56) References Cited

U.S. PATENT DOCUMENTS

| 9,906,544 | B1* | 2/2018 | Kurupati | H04L 63/1425 |
| 2012/0303558 | A1* | 11/2012 | Jaiswal | G06N 20/00 |
| | | | | 706/12 |
| 2016/0299923 | A1* | 10/2016 | Nefedov | G06F 16/2358 |
| 2017/0111506 | A1* | 4/2017 | Strong | G06F 21/32 |
| 2018/0232663 | A1* | 8/2018 | Ross | G06N 3/0454 |

OTHER PUBLICATIONS

Igal Zeifman, "Bot Traffic Report 2016," Imperva Incapsula, retrieved from https://www.incapsula.com/blog/bot-traffic-report-2016.html, Jan. 24, 2017.

(Continued)

*Primary Examiner* — Jacob Lipman
(74) *Attorney, Agent, or Firm* — Keller Jolley Preece

(57) ABSTRACT

Methods, systems, and non-transitory computer readable storage media are disclosed for detecting robotic activity while monitoring Internet traffic across a plurality of domains. For example, the disclosed system identifies network session data for each domain of a plurality of domains, the network session data including network sessions comprising features that indicate human activity. In one or more embodiments, the disclosed system generates a classifier to output a probability that a network session at a domain includes human activity. In one or more embodiments, the disclosed system also generates a classifier to output a probability that a network session includes good robotic activity. Additionally, the disclosed system generates a domain-agnostic machine-learning model by combining models from a plurality of domains with network sessions including human activity.

10 Claims, 10 Drawing Sheets

(56) References Cited

OTHER PUBLICATIONS

Jeff Rajeck, "Five Ways Marketers Can Use Analytics to Combat Ad Fraud," Econsultancy, retrieved from https://econsultancy.com/blog/68852-five-ways-marketers-can-use-analytics-to-combat-ad-fraud/, Mar. 1, 2017.

Distil Networks, White Paper, "Bad Bot Report 2017" retrieved from https://resources.distilnetworks.com/white-paper-reports/2017-bad-bot-report, 2017.

Allison Schiff, "Fraud-day With White Ops: Cut Off The Money, Cut Off The Fraud," Ad Exchanger, retrieved from https://adexchanger.com/platforms/95989/, Sep. 5, 2014.

PerimeterX, "Bot Defender," retrieved from https://www.perimeterx.com/products/bot-defender, 2017.

Allison Schiff, "Fraud-day With DoubleVerify: Bad Actors Are Getting More Sophisticated," Ad Exchanger, retrieved from https://adexchanger.com/platforms/fraud-day-with-doubleverify-bad-actors-are-getting-more-sophisticated/, Aug. 29, 2014.

Kabe T, Miyazaki M, Determining WWW user agents from server access log, Proceedings Seventh International Conference on Parallel and Distributed Systems: Workshops, Iwate, 2000, pp. 173-178.

Guo W, Ju S, Gu Y, Web robot detection techniques based on statistics of their requested URL resources. In: Proceedings of ninth international conference on computer supported cooperative work in design, 2005, pp. 302-306.

Duskin O, Feitelson DG, Distinguishing humans from robots in web search logs: preliminary results using query rates and intervals. In: Proceedings of 2009 workshop on Web Search Click Data, 2009, pp. 15-19.

Tan PN, Kumar V, Discovery of Web robot sessions based on their navigational patterns. Data Min Knowl Discov, 2002, 6(1): 9-35.

Bomhardt C, Gaul W, Schmidt-Thieme L, Web robot detection—preprocessing web logfiles for robot detection. In: New developments in classification and data analysis, 2005, pp. 113-124.

Lu Wz, Yu Sz, Web robot detection based on hidden Markov model. In: Proceedings of international conference on communications, circuits and systems, 2006, pp. 1806-1810.

Ahn Lv, Blum M, Hopper Nj, Langford J, Captcha: using hard AI problems for security. In: Proceedings of Eurocrypt, 2003, pp. 294-311.

Ben-David, Shai; Blitzer, John; Crammer, Koby; Kulesza, Alex; Pereira, Fernando; Wortman Vaughan, Jennifer (2010). "A theory of learning from different domains". Machine Learning Journal. 79 (1-2).

Lourenço, A.G., Belo, O.O.: Catching web crawlers in the act. In: Proceedings of the 6th International Conference on Web Engineering. ICWE '06, New York, NY, USA, ACM (2006) 265-272.

C. Elkan and K. Noto, "Learning classiers from only positive and unlabeled data," in Proceedings of the 14th ACM SIGKDD international conference on Knowledge discovery and data mining, pp. 213-220, ACM, 2008.

Allison Schiff, "Fraud-day With Dstillery: Everyone Is Responsible for Fighting Fraud," Ad Exchanger, retrieved from https://adexchanger.com/platforms/fraud-day-with-dstillery-everyone-is-responsible-for-fighting-fraud/ Sep. 12, 2014.

Distil Networks, "Bot Defense as Adaptable and Vigilant as the Threat Itself: Prevent Web Scraping, Account Takeover, and Fraud," as retrieved on Aug. 12, 2018 from https://areyouahuman.com/state-of-the-human-internet-report.pdf.

Adrienne LaFrance, "The Internet Is Mostly Bots," The Atlantic, retrieved from https://www.theatlantic.com/technology/archive/2017/01/bots-bots-bots/515043/, Jan. 31, 2017.

* cited by examiner

DETECTING ROBOTIC INTERNET ACTIVITY ACROSS DOMAINS UTILIZING ONE-CLASS AND DOMAIN ADAPTATION MACHINE-LEARNING MODELS

BACKGROUND

Improvements in Internet technology have led to an increase in the amount of content and the amount of traffic across the Internet. Every day, billions of people access many different websites. While the amount of human activity has dramatically increased as the availability and accessibility of online content has increased, the amount of non-human activity has also increased. Many entities create automated programs, or "bots," that automatically navigate websites on the Internet. Indeed, robotic activity by bots make up a significant portion of all online traffic, resulting in a large amount of resources (e.g., network resources and processing power) dedicated to serving bot requests and identifying and excluding undesired bot requests.

Robotic activity or bots can be legitimate or malicious. Legitimate or good bots perform actions that provide value to a website. For example, some good bots crawl and index websites for search engines, which helps the websites appear in search results. Bots that crawl websites to ensure that they are functioning properly as part of an analytics check are another example of good bots. Malicious or bad bots can generate false ad impressions, sever spam and malware, and steal content and information.

Some conventional systems use techniques for distinguishing between human activity and robotic activity by implementing protocols that limit or exclude robotic traffic. In particular, the conventional systems use robot exclusion protocols (e.g., "robots.txt") that prevent any bots from accessing certain areas or from performing certain types of interactions on a network application. Good bots, which generally self-identify as bots, cooperate with the indicated prohibitions and do not attempt to access areas or interact in ways that the protocols prohibit. Bad bots, however, typically ignore such prohibitions and generate interactions that do not comply with the protocols. Such conventional systems can thus unintentionally filter robotic activity from good bots while not filtering robotic activity from bad bots.

Furthermore, some conventional systems use a Turing test (e.g., "CAPTCHA") for incoming requests. For instance, these conventional systems can implement a test that requires a user of a client device attempting to access a portion of a network application to identify words or objects in one or more images. While such tests can be effective at limiting robotic activity, these conventional systems also are incapable of distinguishing between good bots and bad bots. Furthermore, bad bots are continuously improving at circumventing Turing tests.

Additionally, some conventional systems attempt to reduce the impact of robotic activity by limiting or excluding traffic from specific domains (e.g., IP addresses). For example, conventional systems can blacklist IP addresses that are sources of known robotic activity so that traffic from these IP addresses is eliminated. While blacklisting IP addresses of known sources of robotic activity effectively restricts access by the identified sources, identifying the sources can be difficult. In addition, conventional systems must update the blacklists regularly after identifying new sources of robotic activity. Updating the lists results in high maintenance costs and provides inefficient detection of robotic activity by limiting the scope of the filtering only to known sources.

Conventional systems lack flexibility and are inefficient at detecting and mitigating robotic activity. In particular, conventional methods often prevent good bots from accessing content while allowing bad bots to circumvent the rules. Along similar lines, some conventional methods cause user frustrations or even block human activity. Furthermore, conventional methods often do not differentiate between bad bots and good bots. To compound the issues, these inflexible and inefficient conventional methods result in wasted computing resources.

SUMMARY

One or more embodiments provide benefits and/or solve one or more of the foregoing or other problems in the art with systems, methods, and non-transitory computer readable storage media for detecting robotic activity in Internet traffic. For example, the disclosed systems use characteristics of human activity to label network sessions at a domain as human activity or robotic activity. The disclosed systems then use the labeled data to generate a classifier for identifying human activity and a classifier for identifying robotic activity. The disclosed systems then use characteristics of good robotic activity to label network sessions identified as robotic activity as good robotic activity or bad robotic activity. The disclosed systems then use the labeled data to generate a classifier identifying good robotic activity. The disclosed systems also generate an activity classifier machine-learning model, using the classifiers, to detect and classify new online activity as human activity, good robotic activity, and bad robotic activity. The disclosed systems can thus efficiently distinguish human activity from robotic activity, and further distinguish good robotic activity from bad robotic activity.

Furthermore, the disclosed systems can also use network session data and machine-learning models for a plurality of domains with high-quality session information (i.e., session data that indicates verifiable human activity) to detect human activity across domains. In particular, the disclosed systems first train a machine-learning model for each domain with high-quality session information. The disclosed systems then use a plurality of machine-learning models for a plurality of high-quality domains to generate a domain-agnostic machine-learning model. Given a set of features for a network session, irrespective of a domain of the network session, the disclosed systems can use the domain-agnostic machine-learning model to determine whether the network session corresponds to human activity or robotic activity, and in some cases, whether robotic activity is good or bad. The disclosed systems can flexibly detect human activity and good robotic activity across a plurality of domains, even if the domains are outside the domains used to train the models. Moreover, the disclosed systems can use the identification of human and robotic activity to exclude robotic activity from processing and analysis when generating analytics reports to provide to domain administrators.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
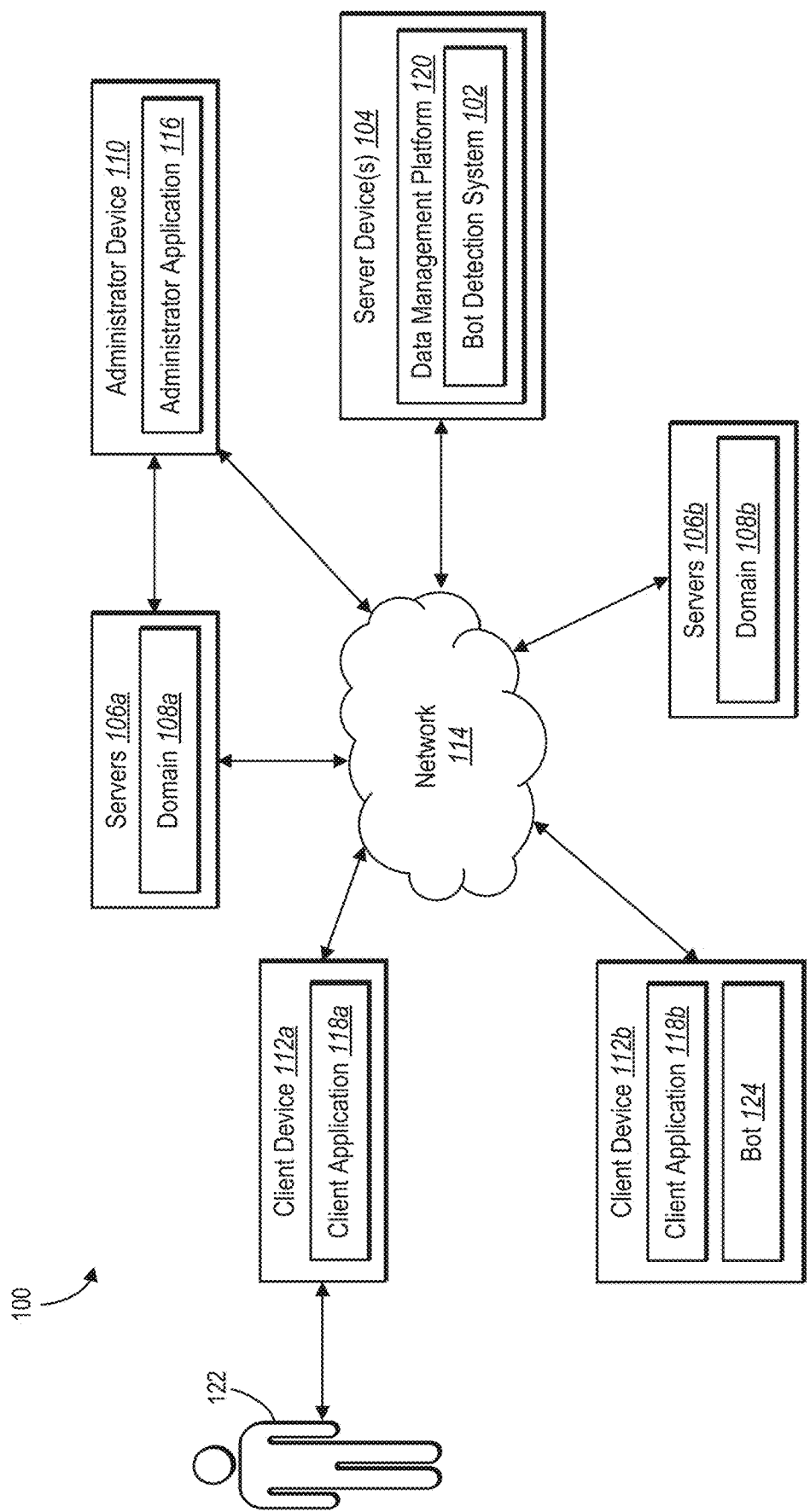
FIG. 1 illustrates an environment in which a bot detection system can operate in accordance with one or more implementations.

One or more embodiments of the present disclosure include a robotic activity detection system (or simply "bot detection system") that detects and classifies automated computer activity as human activity or robotic activity. For example, the bot detection system uses characteristics of human activity to label network sessions as human activity or non-human activity (e.g., robotic activity). The bot detection system then uses the labeled data to generate a classifier for identifying human activity. The bot detection system then uses characteristics of good robotic activity to label network sessions identified as robotic activity as good robotic activity or bad robotic activity. The bot detection system can thus efficiently distinguish human activity from robotic activity, and further distinguish good robotic activity from bad robotic activity.

As described above, the bot detection system can determine whether Internet traffic is human or robotic activity based on identifying activity that is identifiably human activity and using this information to train one or more classifiers. Unfortunately, not all domains generate identifiably human activity. The bot detection system overcomes this drawback by using domain adaptation to transfer models learnt on websites with identifiably human activity to other websites (such as those lacking identifiably human activity). In particular, the bot detection system uses network session data and machine-learning models for a plurality of domains with high-quality session information (i.e., session data that indicates verifiable human activity) to detect human activity across domains. For example, the bot detection system first trains machine-learning models for domains with high-quality session information. The bot detection system then uses these trained machine-learning models to generate a domain-agnostic machine-learning model using domain adaptation.

The bot detection system then uses to the domain-agnostic machine-learning model to determine whether Internet activity is human activity or robotic activity. In particular, given a set of features for a network session, the bot detection system uses the domain-agnostic machine-learning model to determine whether the network session corresponds to human activity or robotic activity. Furthermore, the bot detection system can optionally determine whether robotic activity is good or bad. Thus, the bot detection system can flexibly detect human activity and good robotic activity across a plurality of domains, even if the domains lack high-quality session information. Moreover, the bot detection system can use the identification of human and robotic activity to exclude robotic activity from processing and analysis when generating analytics reports.

More particularly, the bot detection system identifies network session data for each of a plurality of domains. In particular, the bot detection system uses network session data for domains that have features that indicate human activity. For example, the network sessions can include sessions that require human authentication, such as two-factor authentication. In another example, the network sessions can include activity that is likely indicative of human activity, such as product purchases. By identifying network sessions with specific features indicating human activity, the bot detection system can verify that at least some of the network session data at those domains corresponds to human activity.

The bot detection system labels network sessions with features indicating human activity as human activity. Using the labeled network sessions, the bot detection system generates a machine-learning model. Specifically, the bot detection system generates and trains a classifier to classify new network sessions as human activity or robotic activity. Accordingly, each domain (of the corresponding domains) can have a separate machine-learning model that is trained to detect and classify network sessions for the domain.

In one or more embodiments, the bot detection system also identifies network sessions that have features indicating good (i.e., non-malicious) robotic activity for the domains. For instance, the bot detection system can identify good robotic activity based on a heuristic of session characteristics. Such characteristics can include, for example, session length or other features of network sessions that can indicate good robotic activity or bad robotic activity depending on the specific values of the characteristics (e.g., shorter session times are more indicative of bad robotic activity). The bot detection system can then train a classifier to distinguish good robotic activity from bad robotic activity. Thus, the bot detection system can train a model that can not only distinguish human activity from robotic activity at a domain, but also distinguish good robotic activity from bad robotic activity.

Additionally, the bot detection system can use the individual machine-learning models for the domains to generate a domain-agnostic machine-learning model. In particular, the bot detection system generates the domain-agnostic machine-learning model by combining the machine-learning models for domains that have high-quality network session data. For example, the bot detection system can create the domain-agnostic machine-learning model by using domain adaptation of the machine-learning models for the domains. Because the domain-agnostic machine-learning model is based on domains with network session data that includes verifiable human activity, the bot detection system can apply these learned features to other domains.

As mentioned, the bot testing system provides a number of advantages over conventional systems. For example, the bot testing system can improve the accuracy and efficiency of computing systems implementing robotic online activity detection. In particular, the bot detection system can more accurately analyze network session data and determine whether the network session data includes human activity or robotic activity. For instance, by generating a domain-agnostic machine learning model based on a plurality of machine-learning models for domains that include high-quality network session data, the bot detection system can more accurately detect human and robotic activity across a plurality of domains, even for domains with no high-quality network session data. In contrast, conventional systems are limited to detecting robotic activity for an individual domain based solely on the network session data for the individual domain.

Moreover, the bot testing system also reduces the computing load of computing devices implementing robotic activity detection. Specifically, in contrast to conventional systems that analyze each domain independently, the bot detection system can process a small set of high confidence samples (i.e., high-quality network session data) for generalizing to a larger group of domains. Indeed, by generating a machine-learning model based on data from a specific set of domains, the bot detection system can accurately apply network session features from a relatively small set of data for detecting human activity and robotic activity in new network sessions across a variety of domains. Accordingly, while conventional systems would need to process a set of network sessions for each individual domain, the bot detection system can reduce the amount of data processing required for identifying network activity across a large number of domains.

Additionally, the bot detection system improves the flexibility of computing systems implementing robotic activity detection. Specifically, because conventional systems detect robotic (or other) activity independently for separate domains, the conventional systems are unable to detect robotic activity at domains for which the conventional systems do not have historical data. In contrast to the conventional systems, the bot detection system can efficiently analyze and identify network session data at a higher level of granularity than conventional systems, and can analyze network session data even for domains that are not in the domains for which the bot detection system has analyzed historical data. This also allows the bot detection system to exclude or otherwise separate robotic activity from human activity in network session data while processing analytics reports for administrators of separate domains.

As illustrated by the foregoing discussion, the present disclosure utilizes a variety of terms to describe features and advantages of the bot detection system. Additional detail is now provided regarding the meaning of the terms. For example, as used herein, the term "domain" refers to an Internet location. In particular, a domain can include a website, an individual webpage, an IP address, a native application, or other Internet support application. Individual domains can correspond to separate entities, such that an entity is only associated with a single domain. Alternatively, an entity can be associated with more than one domain.

As used herein, the term "network session" or "session" refers to one or more interactions between computing systems over a network connection. For example, a network session can include an interaction between a client device and a server device. To illustrate, a server device can include a system for hosting content (e.g., at a domain) and/or for receiving requests from other computing systems or devices (e.g., client devices). A session can include requests to establish a connection, an authentication, a transmission of data, a request to verify another interaction, or other interactions involved in a communication between two devices/systems. A session can be based on individual visits, time, or logins.

As used herein, the term "robotic activity" refers to automatic computerized activity over a network. To illustrate, a robot (or simply "bot") can include a computerized script or program that automatically accesses one or more domains (e.g., IP addresses) via a network connection to interact with a network application without receiving input from a human to direct the actions of the bot. Specifically, bots typically access domains to obtain specific types of information about the Internet locations. As used herein, the term "good robotic activity" refers to non-malicious activity that is intended to automatically access domains in ways that can be helpful to the domains. To illustrate, good robotic activity can include web crawlers that obtain information from a domain to allow users to find the domain via web search engines. As used herein, the term "bad robotic activity" refers to malicious activity that is intended to automatically access domains that is detrimental to the domains. For instance, bad robotic activity can include scripts or programs that obtain product or pricing information from the websites of competitors of an entity so that the entity can then provide the same products at lower prices than the competitors to drive traffic to their own sites.

As used herein, the term "human activity" refers to human-controlled activity over a network. For instance, human activity can include a human using a client device to access one or more domains via a network connection. Thus, a human can use a client device to access content hosted by a server or otherwise send requests to a server via the network connection. In one example, human activity on a website of a merchant entity can include browsing products and/or making purchases via the website of the merchant entity.

As used herein, the terms "feature" or "characteristic" with respect to a network session refer to an attribute describing an aspect of a particular session. Session features include, but are not limited to, attributes of a computing device associated with the session (including a client device or a server), attributes of a software application associated with the session, attributes of interactions of the session, or attributes describing how the session is conducted. For example, attributes can include IP addresses, computing devices (e.g., desktop computer, laptop computer, smartphone), browser information, user authentication information (e.g., login information, one-time authorization codes), session length/duration, locations accessed within a domain, type of interaction (e.g., product purchase), software application requesting the session, communication protocol, geographical information, or other possible attributes of a session.

As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, etc. Thus, a machine-learning model makes high-level abstractions in data by generating data-driven predictions or decisions from the known input data.

As used herein, the term "classifier" refers to a component for determining a classification of an input data point. For example, a classifier can determine a class corresponding to an unlabeled network session with a network application. To illustrate, a classifier can determine a probability indicating whether a network session corresponds to human activity or robotic activity. Alternatively, a classifier can determine a probability indicating whether a network session corresponds to good robotic activity or bad robotic activity. The bot detection system trains classifiers using historical network session data during one or more training phases.

Additional detail will now be provided regarding the bot detection system in relation to illustrative figures portraying exemplary implementations. For example, FIG. 1 illustrates an embodiment of an environment 100 in which a bot detection system 102 can operate. In particular, the environment 100 includes server device(s) 104, third-party servers 106a, 106b comprising corresponding domains 108a, 108b, an administrator client device 110, and client devices 112a, 112b. One or more of the components may be in connection via a network 114. Moreover, as shown, the administrator client device 110 can include an administrator application 116. The client devices 112a, 112b include client applications 118a, 118b. The server device(s) 104 include a data management platform 120, which includes the bot detection system 102 to detect and identify robotic activity for the domains 108a, 108b.

In one or more embodiments, the administrator device 110 includes a computing device capable of performing operations associated with domain access management and data management at the domain 108a. For example, the administrator client device 110 can include a desktop computer, laptop computer, tablet, smartphone, or other device that is able to access the bot detection system 102 via the network 114. As mentioned, the administrator client device 110 can include the administrator application 116, which can include software for communicating with the server device(s) 104 to provide and obtain information related to domain access management and data management operations described herein. Additionally, the domain 108b can also be associated with an administrator client device running an administrator application for allowing domain access management and data management for the domain 108b.

Additionally, as illustrated, the domains 108a, 108b operate on third-party servers 106a, 108b, respectively. In one or more embodiments, the domains 108a, 108b include software that operates in a distributed environment (e.g., a cloud service or plurality of networked servers that host content associated with the separate domains 108a, 108b). Alternatively, some domains can operate on a single server, such that client devices accessing the domains communicate with the single server. In any case, the websites or other content corresponding to the domains 108a, 108b are hosted on the respective third-party servers 106a, 106b, and can be in communication with any number of client devices.

In one or more embodiments, the client devices 112a, 112b include computing devices capable of accessing the domains 108a, 108b by sending requests to the third-party servers 106a, 106b, respectively. Specifically, the client devices 112a, 112b can include computing devices that are able to access one or more server devices at the domains 108a, 108b by communicating with the one or more server devices via the network 114. For instance, one or more of the client devices 112a, 112b can include a mobile device such as a mobile telephone, a smartphone, a PDA, a tablet, or a laptop computer. Alternatively, one or more of the client devices 112a, 112b may include a non-mobile device such as a desktop computer. The client devices 112a, 112b also include client applications 118a, 118b that include software (e.g., a web browser or other application) for sending requests to the domains 108a, 108b such as to access content.

Furthermore, as illustrated, the client device 112a is associated with a user 122 (i.e., a human user). The user 122 utilizes the client device 112a to access the domain 108a by interacting with the client application 118a running on the client device 112a. For instance, the user 122 can use the client application 118a to access one or more webpages or other content hosted on the third-party server 106a. The user 122 can browse and/or purchase products offered by a merchant associated with the domain 108a or perform other operations associated with making requests to the domain 108a.

While the client device 112a is associated with a human user, FIG. 1 illustrates that the client device 112b includes a bot 124. As previously described, the bot 124 can include a computerized script or software that automatically sends requests to the third-party servers 106a corresponding to the domain 108a. In one or more embodiments, the bot 124 is a script or application that runs separately from the client application 118b and interfaces with the client application 118b. Alternatively, the bot 124 can be a plug-in or other component that is part of the client application 118b. Thus, rather than the client device 112b contacting the third-party servers 106b in response to a human user providing input via the client application 118b, the client device 112b communicates with the servers 106b in response to commands that the bot 124 provides.

According to one or more embodiments, the data management platform 120 allows entities associated with the domains 108a, 108b to manage access to data on the third-party servers 106, 106b. For instance, an administrator associated with an entity corresponding to the domain 108a can use the administrator device 110 to communicate with the data management platform 120 via the network 114 to view information indicating visits or other access requests to the domain 108a by client devices (including client devices 112a, 112b). In particular, the administrator can use the administrator application 116 of the administrator device 110 to provide information to the data management platform 120 about one or more network locations (e.g., IP addresses) of the domain 108a, and also to generate and view analytics reports. In one or more embodiments, the data management platform 120 obtains the data for the analytics reports directly from a client device when the client device accesses the domain 108a and stores the data in a database. Alternatively, the data management platform 120 can obtain the data from the third-party servers 106a.

The bot detection system 102 of the data management platform 120 can use information from a plurality of domains (including domain 108a, 108b and any number of additional domains) for use in detecting and identifying activity at the plurality of domains. Specifically, the bot detection system 102 can obtain access requests for each of the domains and then use the obtained information to generate a machine-learning model for each of the domains. The machine-learning model for each domain includes an activity classifier model that can detect activity and distinguish human activity from robotic activity. In at least some implementations, the bot detection system 102 also distinguishes good robotic activity from bad robotic activity at each domain using the activity classifier model.

The bot detection system 102 can use a plurality of machine-learning models for a plurality of domains to generate a domain-agnostic machine-learning model. The domain-agnostic machine-learning model allows the bot detection system to then detect activity and distinguish types of activity for any domain in communication with the data management platform 120. For example, the bot detection system 102 can detect robotic activity even for domains that are not in the domains used to generate/train the domain-agnostic machine-learning model. To illustrate, the bot detection system 102 can detect human activity, good robotic activity, and bad robotic activity at a plurality of domains that are in communication with the data management platform 120.

In one or more embodiments, the bot detection system 102 uses machine-learning models from domains with high-quality network session data to generate the domain-agnostic machine-learning model. For instance, the bot detection system 102 can generate machine-learning models only for domains (e.g., domain 108a) that include network sessions with features that indicate human activity. The bot detection system 102 can then train the domain-agnostic machine-learning model on features of high-quality network sessions using domain adaptation so that the domain-agnostic machine-learning model can detect the same or similar features in network session data of other domains (e.g., domain 108b). Alternatively, the bot detection system 102 can access one or more machine-learning models for individual domains from another system (e.g., a separate system or a plurality of separate systems) corresponding to the bot detection system 102 or corresponding to one or more domains. Thus, the bot detection system 102 can generate the machine-learning models corresponding to the domains, receive or otherwise access existing models, or combine new and previously existing models to generate the domain-agnostic machine-learning model.

In addition to detecting and identifying activity at a plurality of domains, the bot detection system 102 can generate analytics reports to provide to the administrator device 110. For instance, the bot detection system 102 can collect information associated with new network sessions at a domain. After identifying/classifying the new network sessions using the domain-agnostic machine-learning model, the bot detection system 102 can analyze the new network sessions to generate an analytics report that provides information about the classified network sessions. The bot detection system 102 can then provide the analytics report to the administrator device 110 for display within a graphical user interface of the administrator application 116.

Although the environment 100 of FIG. 1 is depicted as having various components, the environment may have any number of additional or alternative components (e.g., any number of servers, server devices, administrator devices, client devices, or other components in communication with the data management platform 120). In particular, FIG. 1 illustrates a particular number and arrangement of client devices 112a, 112b, third-party servers 106a, 106b and administrator device 110, it will be understood that the environment 100 can include any number of devices, including any number of client devices, servers (and domains), or administrator devices. Accordingly, the bot detection system 102 can utilize information for a set of domains to provide robotic activity detection for any number of domains. Thus, the data management platform 120 can manage data and provide robotic activity detection for any number of domains.

Figure 2:
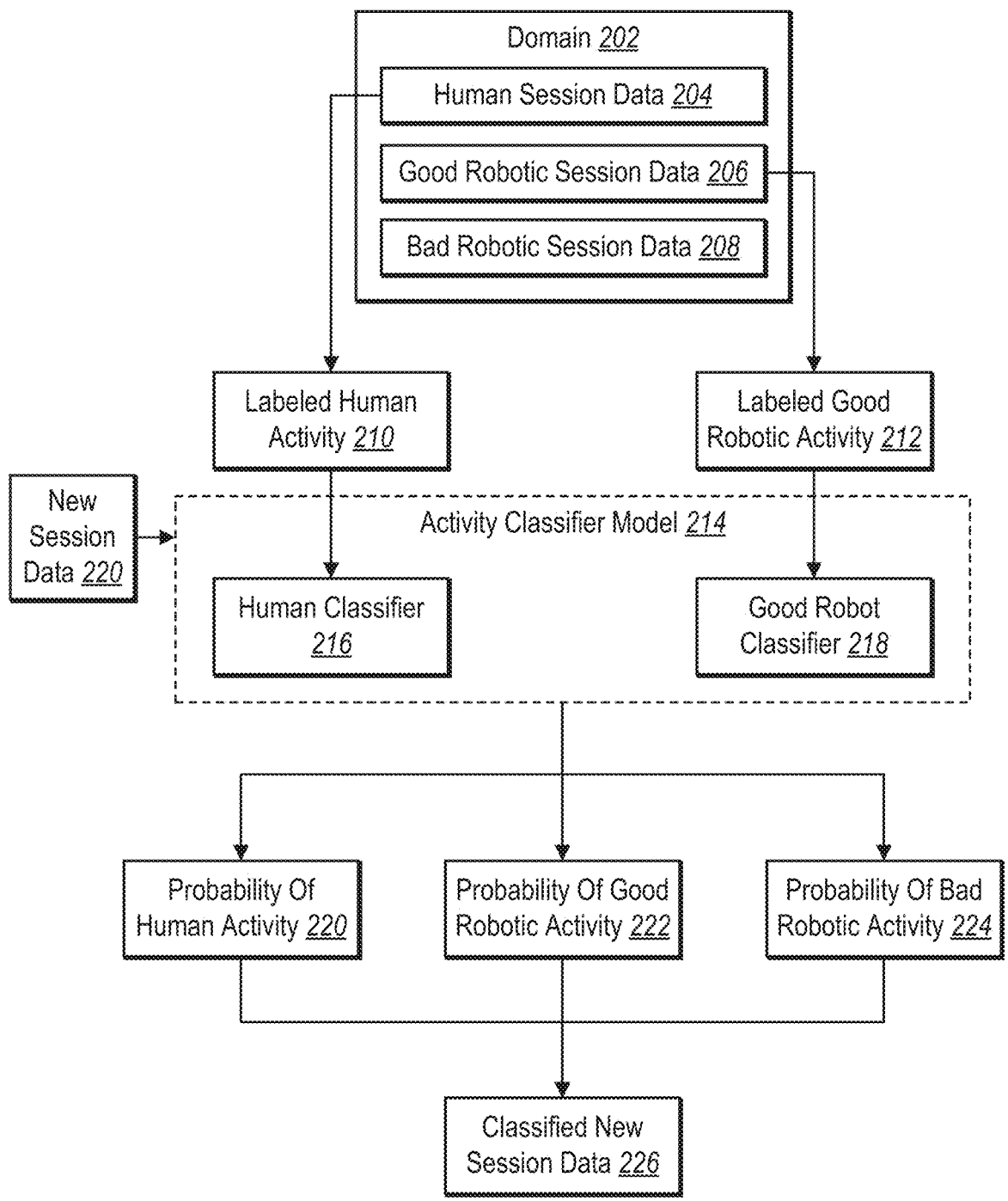
FIG. 2 illustrates a diagram of a process of training and utilizing an activity classifier model for classifying network session data for a domain in accordance with one or more implementations.
Figure 3:
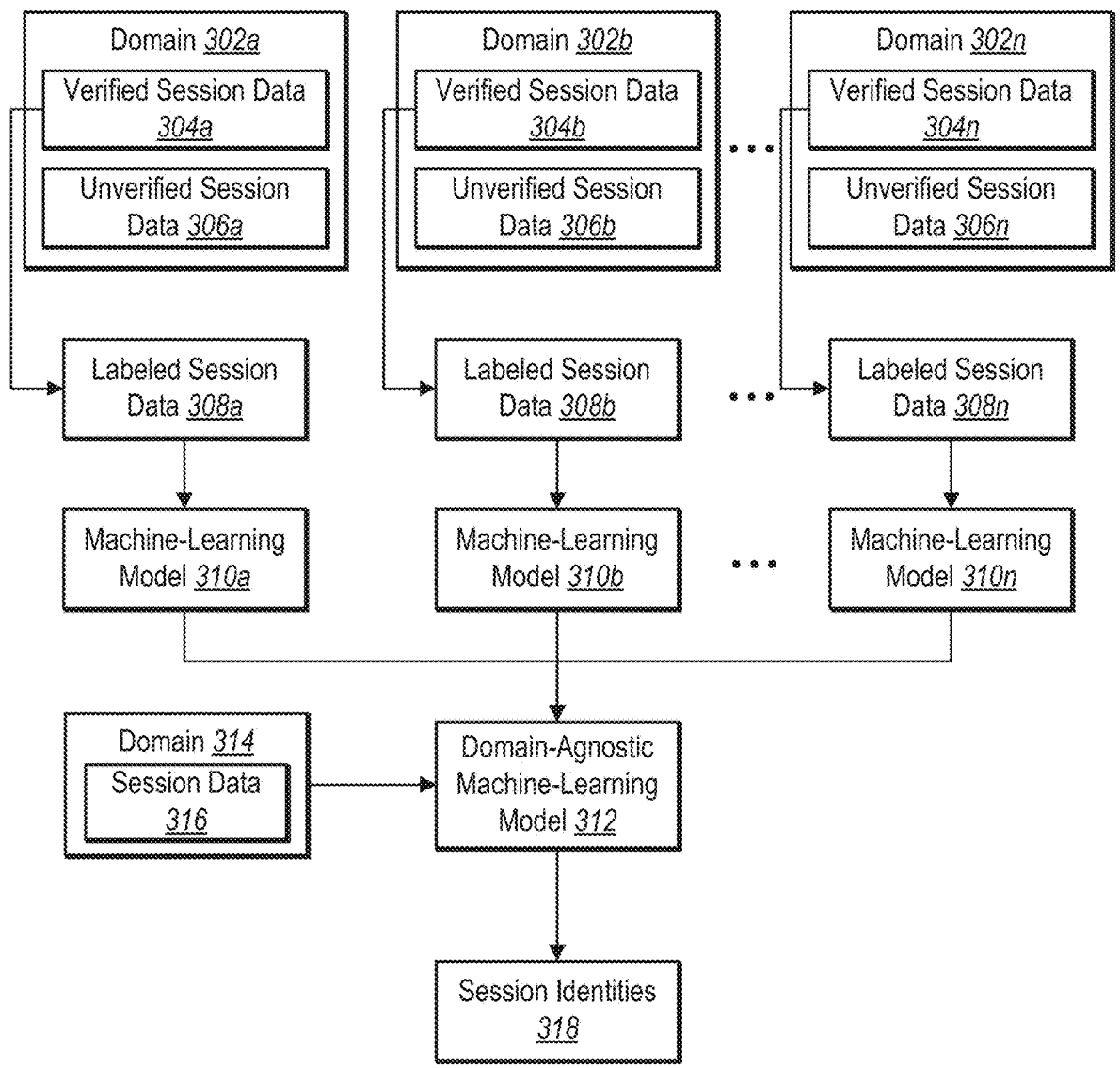
FIG. 3 illustrates a diagram of a process of training and utilizing a domain-agnostic machine-learning model for determining network session identities in accordance with one or more implementations.

As briefly mentioned previously, the bot detection system 102 performs the operations described herein for a plurality of domains by generating a domain-agnostic machine-learning model based on machine-learning models of individual domains with high-quality network session data. FIG. 2 illustrates a diagram of a process for generating and utilizing a machine-learning model to classify network sessions as human activity, good robotic activity, or bad robotic activity. Additionally, FIG. 3 illustrates a diagram of a process for generating a domain-agnostic machine-learning model from a plurality of machine-learning models for a plurality of domains. While FIG. 2 illustrates that the machine-learning model can distinguish between good robotic activity and bad robotic activity, the bot detection system 102 may generate a machine-learning model that only distinguishes between human activity and robotic activity. Accordingly, the domain-agnostic machine-learning model of FIG. 3 may also allow the bot detection system 102 to classify new network sessions for a plurality of domains in a variety of ways. Specifically, various embodiments of the domain-agnostic machine-learning model may classify network sessions as human activity or robotic activity for a plurality of domains, while other embodiments of the domain-agnostic machine-learning model may classify network sessions as human activity, good robotic activity, or bad robotic activity for a plurality of domains.

As illustrated in FIG. 2, a process for generating and utilizing a machine-learning model to classify network sessions for a domain 202 begins by identifying network session data for the domain 202. Specifically, the bot detection system 102 accesses a repository of network session data that includes a plurality of previously collected network sessions at the domain. The plurality of network sessions includes network sessions from a plurality of client devices connecting to the domain 202. The network sessions can include, for example, requests by client devices to access content such as webpages and metadata on a website associated with the domain 202.

When the bot detection system 102 identifies the network session data for the domain 202, the bot detection system 102 attempts to determine a type for each network session in the plurality of network sessions. In particular, the network sessions can include human session data 204 corresponding to human activity, good robotic session data 206 corresponding to non-malicious robotic activity, and/or bad robotic session data 208 corresponding to malicious robotic activity. The bot detection system 102 identifies network sessions corresponding to the various types of activity (human, good bot, bad bot) based on features of the network session.

In one or more embodiments, the bot detection system 102 identifies network sessions corresponding to human activity based on the network sessions including features that indicate human activity. For instance, as previously mentioned, features that indicate human activity can include login sessions that require authentication that indicates that a human user has provided the authentication. To illustrate, the bot detection system 102 can obtain information from the domain 202 for a network session including an indicator that the network session required two-factor authentication such as a one-time authorization code. Alternatively, the bot detection system 102 can determine that a network session required the user to perform a Turing test type of operation (e.g., a CAPTCHA or reCAPTCHA operation). In another example, the bot detection system 102 determines that a network session included an operation that a bot typically does not perform, such as a product purchase.

Furthermore, the bot detection system 102 can identify network sessions corresponding to good robotic activity based on the network sessions including features that indicate good robotic activity. As briefly mentioned previously, good robotic activity can include web crawlers or other bots that mine data from a domain in a way that can provide a benefit to the domain. To illustrate, the bot detection system 102 can determine that network sessions corresponding to good robotic activity have session durations that last longer than network sessions corresponding to bad robotic activity. Specifically, bad bots typically attempt to escape identification by performing short network sessions (e.g., by initiating each page request in a new browser process). Accordingly, good robotic activity can be characterized using a heuristic for the session length of the sessions, such that sessions with longer duration correspond to good bots, while sessions with shorter durations correspond to bad bots.

In one or more embodiments, the bot detection system 102 determines that sessions with at least a predetermined duration (defined by the 3rd quartile of the distribution of session lengths) correspond to good robotic activity. Alternatively, the bot detection system 102 can use other methods of determining a session duration/length for identifying good robotic activity. For instance, the bot detection system 102 can use historical data or verified bad robotic activity from one or more other domains, or other features of the sessions, such as whether a single device initiates each new request in a new browser process.

Based on the features above, the bot detection system 102 can then identify and label the session data for generating classifiers for the human activity and the robotic activity. Specifically, the bot detection system 102 creates labeled human activity 210 and labeled good robotic activity 212. More specifically, the bot detection system 102 labels network sessions with human activity as the labeled human activity 210 and labels network sessions with good robotic activity as labeled good robotic activity 212. For instance, the bot detection system 102 determines that network sessions that have the features indicating human activity correspond to human activity. The bot detection system 102 then determines that network sessions that do not have features indicating human activity, but that have features indicating good robotic activity, correspond to good robotic activity. The bot detection system 102 may also determine that network sessions that do not have features indicating human activity or good robotic activity correspond to bad robotic activity.

Using the labeled network sessions as positive examples, the bot detection system 102 creates and trains classifiers for an activity classifier model 214. In particular, the bot detection system 102 creates a human classifier 216 for identifying network sessions corresponding to human activity. For instance, the bot detection system 102 trains the human classifier 216 to learn features indicating human activity based on the positive examples of the labeled human activity 210. In one or more embodiments, the learned features include one or more of the previously described features indicating human activity. Additionally, the learned features may include other features corresponding to the network sessions that are typically associated with human activity. The training process allows the human classifier 216 to automatically determine the relevant features for human activity.

Furthermore, the bot detection system 102 creates a good robot classifier 218 for identifying network sessions corresponding to good robotic activity. To illustrate, the bot detection system 102 trains the good robot classifier 218 to learn features indicating good robotic activity based on the positive examples of the labeled good robotic activity 212. The learned features for the good robot classifier 218 can include one or more of the features described previously (e.g., the session length) or may include alternative or additional features typically associated with good robotic activity. The bot detection system 102 trains the good robot classifier 218 to automatically determine the relevant features corresponding to good robotic activity in network sessions.

Once the bot detection system 102 has trained the human classifier 218 and the good robot classifier 218, the bot detection system 102 can use the trained activity classifier model 214 to classify new network sessions for the domain 202. In particular, the bot detection system 102 can input new session data 220 to the activity classifier model 214. The activity classifier model 214 can apply the human classifier 216 to a new network session in the new session data 220 to determine whether the new network session corresponds to human activity. Additionally, the activity classifier model 214 can also apply the good robot classifier 218 to the new network session to determine whether the new network session corresponds to good robotic activity.

During a training phase for each of the classifiers, the bot detection system 102 can utilize a loss function to compare predicted values to actual values of training data. The bot detection system 102 can create a loss function that represents differences between the predicted values and the actual values. The bot detection system 102 can use the loss function to further train a given classifier to reduce or eliminate the differences in the loss function and improve the accuracy of the classifier.

In one or more embodiments, when processing the new session data 220, the activity classifier model 214 uses the classifiers to output a probability a human activity 220, a probability of good robotic activity 222, and a probability of bad robotic activity 224. Specifically, the activity classifier model 214 can use a one-versus-the-rest model to output the probabilities using the classifiers. To illustrate, the activity classifier model 214 uses the human classifier 216 to first generate a probability indicating whether the new network session corresponds to human activity or other activity (i.e., non-human/robotic activity). The activity classifier model 214 uses the good robot classifier 218 to generate a probability indicating whether the new network session corresponds to good robotic activity or other activity (i.e., human activity or bad robotic activity). Based on the outputs of the two classifiers, the activity classifier model 214 can then output probabilities for each of the different types of activity (i.e., human activity, good robotic activity, and bad robotic activity). Thus, by using only two classifiers, the activity classifier model 214 can output three probabilities.

In addition, after using the activity classifier model 214 to output probabilities for each of the types of activity for a new session, the bot detection system 102 can determine a most likely class for the new session. In particular, the bot detection system 102 determines, for each new session in the new session data, a class based on the probabilities. For instance, the bot detection system 102 determines that a new session data belongs to a given class if the probability corresponding to that class is higher than the probabilities for the other classes. Thus, the bot detection system 102 generates classified new session data 226 by labeling each of the new sessions based on the probabilities that the activity classifier model 214 generates. In one or more embodiments, the activity classifier model 214 generates the classified new session data 226, while in other embodiments, the activity classifier model 214 outputs the probabilities, and another component of the bot detection system 102 generates the classified new session data 226.

To illustrate an example of the one-versus-the-rest model in a test case, the bot detection system 102 can use the activity classifier model 214 to analyze a set of new session data for which the classifications are known. Specifically, for a set of session data including 23,641 network sessions (i.e., n=23,641) corresponding to human activity, good robotic activity, or bad robotic activity, the activity classifier model 214 applies the human classifier 216 and the good robot classifier 218 to output predictions of identities of the network sessions. To illustrate the accuracy of the activity classifier model 214, a confusion matrix for the human classifier 216 is:

|  | Human (Predicted) | Other (Predicted) |
|---|---|---|
| Human (Actual) | 17206 | 101 |
| Other (Actual) | 1014 | 5310 |

Additionally, a confusion matrix for the good robot classifier 218 is:

|  | Good Bot (Predicted) | Other (Predicted) |
|---|---|---|
| Good Bot (Actual) | 10238 | 303 |
| Other (Actual) | 1244 | 11856 |

As shown in the confusion matrices above, the human classifier 216 and the good robot classifier 218 produce predictions with high accuracy. In particular, the strong diagonal elements in the matrices indicate that the prediction of the classifiers match the true labels of the corresponding instances with high accuracy. Additionally, based on the above data the probabilities output by the activity classifier model 214 are illustrated in the table below:

| Class | Number of Sessions | % of Sessions |
|---|---|---|
| Humans | 11157 | ~48% |
| Good Bots | 6148 | ~25% |
| Bad Bots | 6336 | ~27% |

In addition to illustrating that the predicted labels by the classifiers match the true labels with high accuracy in the confusion matrices above, the predicted traffic distribution also closely follows the current distribution typical of human/bot activity in online interactions (i.e., robotic activity making up approximately half of all online traffic).

While FIG. 2 illustrates a model that uses two classifiers to output three probabilities, the bot detection system 102 may use a single classifier to output two probabilities. For example, the bot detection system 102 can determine whether the new session data 220 corresponds to human activity or robotic activity without distinguishing between good bots and bad bots. The bot detection system 102 can thus use various positive and unlabeled learning techniques, one-versus-the-rest (or one-versus-all) techniques, and/or other classification techniques for training the activity classifier model 214 to classify network sessions into two or more classes, as may serve a particular embodiment.

Additionally, the bot detection system 102 can utilize the output of the activity classifier model 214 to further train the activity classifier model 214. For instance, the bot detection system 102 can verify one or more network sessions in the new session data 220 to determine whether the network sessions correspond to human activity or good robotic activity by analyzing the features of the network sessions. To illustrate, the bot detection system 102 can determine whether a network session labeled as human activity includes a feature indicating human activity (e.g., login requiring two-factor authentication, purchase, or other human interaction with a domain). Similarly, the bot detection system 102 can determine whether a network session labeled as good robotic activity includes a feature indicating good robotic activity (e.g., based on session duration or number of browser processes performed).

In response to comparing the predicted classes to the actual classes of the network sessions, the bot detection system 102 can further train the activity classifier model 214 to update or fine tune algorithms in the activity classifier model 214. In particular, the bot detection system 102 can generate a loss function that indicates the differences between the predicted and actual values of the new network session data 220, and then feed the loss function back into the activity classifier model 214. The bot detection system 102 can thus train the activity classifier model 214 to reduce the loss function and improve the output by modifying one or more algorithms based on learned features of network sessions for one or more of the classifiers 216, 218.

As noted above, labels for both classes (e.g., human vs. bot or good bot vs. bad bot) may not present or detectible with high confidence. To train highly accurate classifiers, the bot detection system 102 use the following algorithm. As used below, b denotes a binary variable denoting whether a particular session involves a purchase or other features that indicates human activity. Similarly, y denotes a binary variable denoting whether a particular session is human generated. Also, x denotes a feature vector of a given session. The target classifier is $P(y=1|x)=0$, which denotes the probability of the session being human generated given the session's attributes. The bot detection system 102 makes an assumption that bots do not have the feature b, which translates to $P(b=1, y=0|x)=0$. This means that the probability that a bot generated session ($y=0$) includes the feature b ($b=1$) is zero. The bot detection system 102 marginalizes $P(b=1|x)$ over y: $P(b=1|x)=P(b=1, y=1|x)+P(b=1, y=0|x)$. Using the assumption that bots do not have the feature b, which translates to $P(b=1, y=0|x)=0$, simplifies to $P(b=1|x)=P(b=1, y=1|x)+0$. The bot detection system 102 then applies the conditional probability expansion to arrive at Equation 1 in which $P(b=1|x)=P(y=1|x)P(b=1|y=1, x)$.

Additionally, or alternatively, the bot detection system 102 rearranges Equation 1 to provide Equation 2 (shown below), which indicates that the probability that a session is a human session is equal to the probability that the session includes feature b divided by the probability that session includes feature b given that the session is a human session.

$$P(y=1|x) = \frac{P(b=1|x)}{P(b=1|y-1,x)}$$

As described above, FIG. 2 illustrates as process for generating a machine-learning model for a single domain. As mentioned previously, the bot detection system 102 can use a plurality of machine-learning models corresponding to individual domains to generate a domain-agnostic machine-learning model that is not specific to only a single domain. FIG. 3 illustrates a process for generating a domain-agnostic machine-learning model using a plurality of machine-learning models for individual domains with high-quality network session data.

As illustrated in FIG. 3, a generating a domain-agnostic machine-learning model using a plurality of machine-learning models for individual domains begins by identifying session data for a plurality of domains $302a$-$302n$. Specifically, the bot detection system 102 first determines the domains $302a$-$302n$ by identifying domains that have high-quality session data. As previously described, high-quality session data can include network sessions that require login operations, such as two-factor authentication. Alternatively, the bot detection system 102 can determine that certain online interactions qualify as high-quality session data such as purchases or similar interactions that humans perform. In any case, each domain $302a$-$302n$ can have verified session data $304a$-$304n$ indicating the high-quality session data and unverified session data $306a$-$306n$ indicating session data that does not exhibit one or more features associated with high-quality network sessions.

As described in relation to FIG. 2, verified session data may include human activity. Additionally, verified session data may also include good robotic activity. The bot detection system 102 can determine whether to distinguish only human activity from robotic activity or to further distinguish good robotic activity from bad robotic activity, as may serve a particular embodiment. The bot detection system 102 may flexibly make such a determination based on the information available (e.g., based on whether features indicating good robotic activity are available to the bot detection system 102) or based on input from an administrator of an entity associated with a domain.

In one or more embodiments, the bot detection system 102 selects all domains in communication with the data management platform 120 of FIG. 1 that have high-quality session data. In one or more alternative embodiments, the bot detection system 102 selects a subset of domains based on the amount of session data available for the domains. Thus, the bot detection system 102 can use some or all available high-quality session data, as may serve a particular embodiment.

Once the bot detection system 102 has identified a plurality of domains $302a$-$302n$ with high-quality session data, the bot detection system 102 labels the verified session data $304a$-$304b$. Specifically, for a first domain $302a$, the bot detection system labels the verified session data $304a$ to create labeled session data $308a$. Similarly, for a second domain $302b$, the bot detection system labels the verified session data $304b$ to create labeled session data $308b$. The bot detection system 102 can continue labeling session data for domains until domain $302n$, for which the bot detection system 102 labels the verified session data $304n$ to create labeled session data $308n$.

Using the labeled session data $308a$-$308n$ for the plurality of domains $302a$-$302n$, the bot detection system 102 creates a plurality of machine-learning models $310a$-$310n$. For instance, the bot detection system 102 creates a machine-learning model $310a$ corresponding to the domain $302a$ using the labeled session data $308a$. The bot detection system 102 can also create a machine-learning model $310b$ corresponding to the domain $302b$ using the labeled session data $308b$. Similarly, the bot detection system 102 creates any number of machine-learning models for any number of domains until machine-learning model $310n$ for domain $302n$ using the labeled session data $308n$.

In one or more embodiments, the bot detection system 102 labels session data for each domain $302a$-$302n$ in separate processes while creating machine-learning models $310a$-$310n$ for each domain $302a$-$302n$. Specifically, the bot detection system 102 may label session data and then create a machine-learning model for a given domain prior to labeling data (and then creating a corresponding machine-learning model) for a different domain. Thus, the bot detection system 102 can create each machine-learning model independently for each domain and may add new machine-learning models for new domains at any time after creating machine-learning models for other domains. Additionally, the bot detection system 102 may label session data and/or create machine-learning models for a plurality of domains (e.g., any subset of two or more domains) in parallel. Furthermore, the bot detection system 102 may group two or more domains together for labeling session data and creating a machine-learning model, such as if the domains are common to a given entity or are share some other characteristic.

As mentioned above, the bot detection system 102 may classify only human activity from robotic activity, or may classify human activity, good robotic activity, and bad robotic activity. Accordingly, the bot detection system 102 can use any appropriate machine-learning techniques, as described above with respect to FIG. 2, to generate the machine-learning models $310a$-$310n$. Additionally, the output of the machine-learning models $310a$-$310n$ is based on the type of classification of a particular embodiment (e.g., human/bot or human/good bot/bad bot).

Once the bot detection system 102 has generated and trained the machine-learning models $310a$-$310n$ for the domains $302a$-$302n$, the bot detection system 102 then generates a domain-agnostic machine-learning model 312. In particular, the bot detection system 102 combines the machine-learning models $310a$-$310n$ to create the domain-agnostic machine-learning model 312. For instance, the bot detection system 102 can use domain adaptation to use features learned from the plurality of machine-learning models $310a$-$310n$ to apply to any domain, even if the analyzed domain is not in the domains $302a$-$302n$.

As a specific example, the bot detection system 102 can generate a plurality of machine-learning models that are based on a plurality of websites with high-quality session data (e.g., websites associated with financial institutions). Each website is thus associated with a separate machine-learning model trained to identify human activity for that website based on features corresponding to network sessions that indicate the human activity at the website. The bot detection system 102 can then use the machine-learning models to generate a new machine-learning model that is applicable to a target website, even if the target website is not included in the plurality of websites with high-quality session data and for which the bot detection system 102 generated a machine-learning model. Furthermore, the target website may not have high-quality session data, but because the machine-learning models automatically learn features that indicate human activity, the domain-agnostic machine-learning model can apply the learned features to the target website.

In one or more embodiments, the bot detection system 102 utilizes domain adaptation to generate the domain-agnostic machine-learning model 312. Specifically, the bot detection system 102 transfers learning from the machine-learning models $310a$-$310n$ to the domain-agnostic machine-learning model 312. For instance, the bot detection system 102 can use domain adaptation to combine the learned features from the plurality of domains 302a-302n for adapting to another domain. To transfer the learned features from the domains 302a-302n for use in another domain (e.g., domain 314), the bot detection system 102 relies on the labeled session data 308a-308n, which includes network sessions with a plurality of features. The bot detection system 102 is able to train the domain-agnostic machine-learning model 312 to learn features of network sessions that indicate specific activity (e.g., human activity or good robotic activity) across multiple domains.

In one or more embodiments, one or more features learned for a first domain overlap with features learned for a second domain. In one or more additional embodiments, one or more features learned for the first domain do not overlap with features learned for a third domain. The bot detection system 102 can learn the features that overlap across domains and those that do not overlap across domains to determine relevant cross-domain features that are applicable for classifying activity regardless of domain. For instance, the bot detection system 102 can use one or more domain adaptation techniques to generate the domain-agnostic machine-learning model 312, including unsupervised domain adaptation or semi-supervised domain adaptation. The bot detection system 102 can use reweighting algorithms to reweight labeled session data to resemble target session data (e.g., session data 316), iterative algorithms to iteratively label target session data and update the domain-agnostic machine-learning model 312, or adversarial machine-learning techniques to find a common representation space for multiple domains.

Once the bot detection system 102 has adapted the machine-learning models 310a-310n to generate the domain-agnostic machine-learning model 312, the bot detection system 102 can apply the domain-agnostic machine-learning model 312 to the domain 314. In particular, the bot detection system 102 can input the session data 316 to the domain-agnostic machine-learning model 312. The domain-agnostic machine-learning model 312 can then apply the learned features by combining the machine-learning models 310a-310n to the session data 316.

The domain-agnostic machine-learning model 312 outputs session identities 318 for the session data 316. Specifically, the output of the domain-agnostic machine-learning model 312 can include a humanness score for each of the network sessions in the session data 316. As used herein, the term "humanness score" refers to a numerical value that represents a likelihood of a network session corresponding to human activity. For example, a humanness score can be a value within a specific range of values (e.g., 0 to 100 or o to 1). Thus, the domain-agnostic machine-learning model 312 can output a value indicating a probability for each network session corresponding to human activity.

Additionally, in one or more embodiments, the bot detection system 102 outputs a good bot score for each of the network sessions in the session data 316. As used herein, the term "good bot score" refers to a numerical value that represents a likelihood of a network session corresponding to good robotic activity. Similar to the humanness score, a good bot score can be a value within a range of values (e.g., 0 to 100 or 0 to 1). The bot detection system 102 can thus generate a humanness score and a good bot score for a network session to determine a probability that the network session corresponds to human activity or good robotic activity. Alternatively, the bot detection system 102 can generate only a humanness score in cases in which the bot detection system 102 identifies whether network sessions correspond to human activity or robotic activity generally. The bot detection system 102 can then use the scores to determine the most likely class for the network session and then classify the network session accordingly.

As described in relation to FIGS. 2 and 3, the bot detection system 102 can thus generate predictions of network sessions corresponding to human activity, good robotic activity, or bad robotic activity for individual domains, as well as across multiple domains. Accordingly, the acts and operations illustrated and described above in relation to FIG. 2 can provide the corresponding structure for an example step for generating, for each domain of the plurality of domains, an activity classifier model that determines whether network sessions at a domain of the plurality of domains correspond to human activity, good robotic activity, or bad robotic activity using a first classifier corresponding to human activity and a second classifier corresponding to good robotic activity. Furthermore, the acts and operations illustrated and described above in relation to FIG. 3 can provide the corresponding structure for an example step for generating, using a plurality of activity classifier models for the plurality of domains, a domain-agnostic machine-learning model for determining whether network sessions correspond to human activity or robotic activity irrespective of a domain of the network sessions.

Figure 4A:
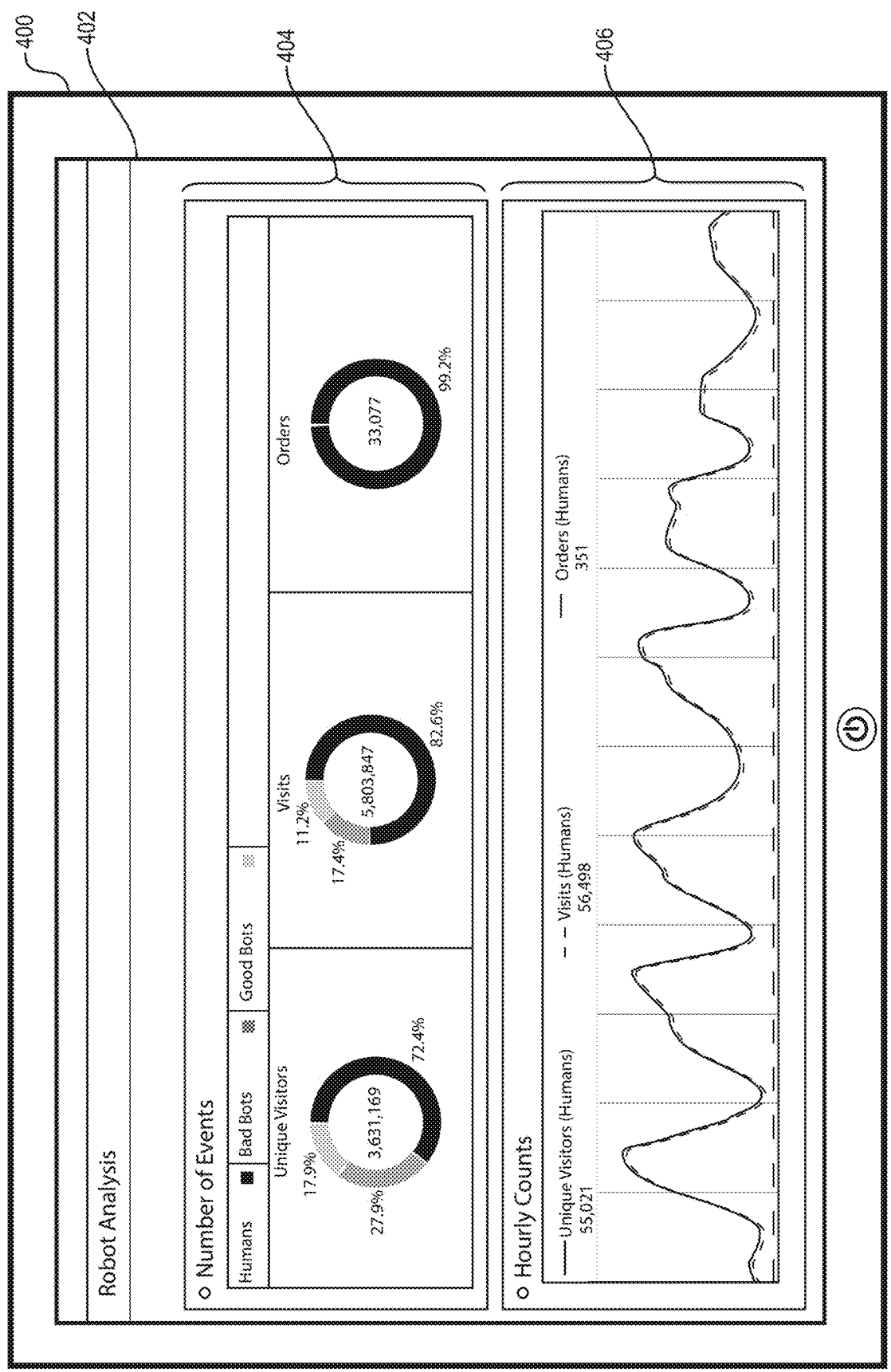
FIGS. 4A-4C illustrate user interfaces of analytics information for network session data of a domain in accordance with one or more implementations.
Figure 4B:
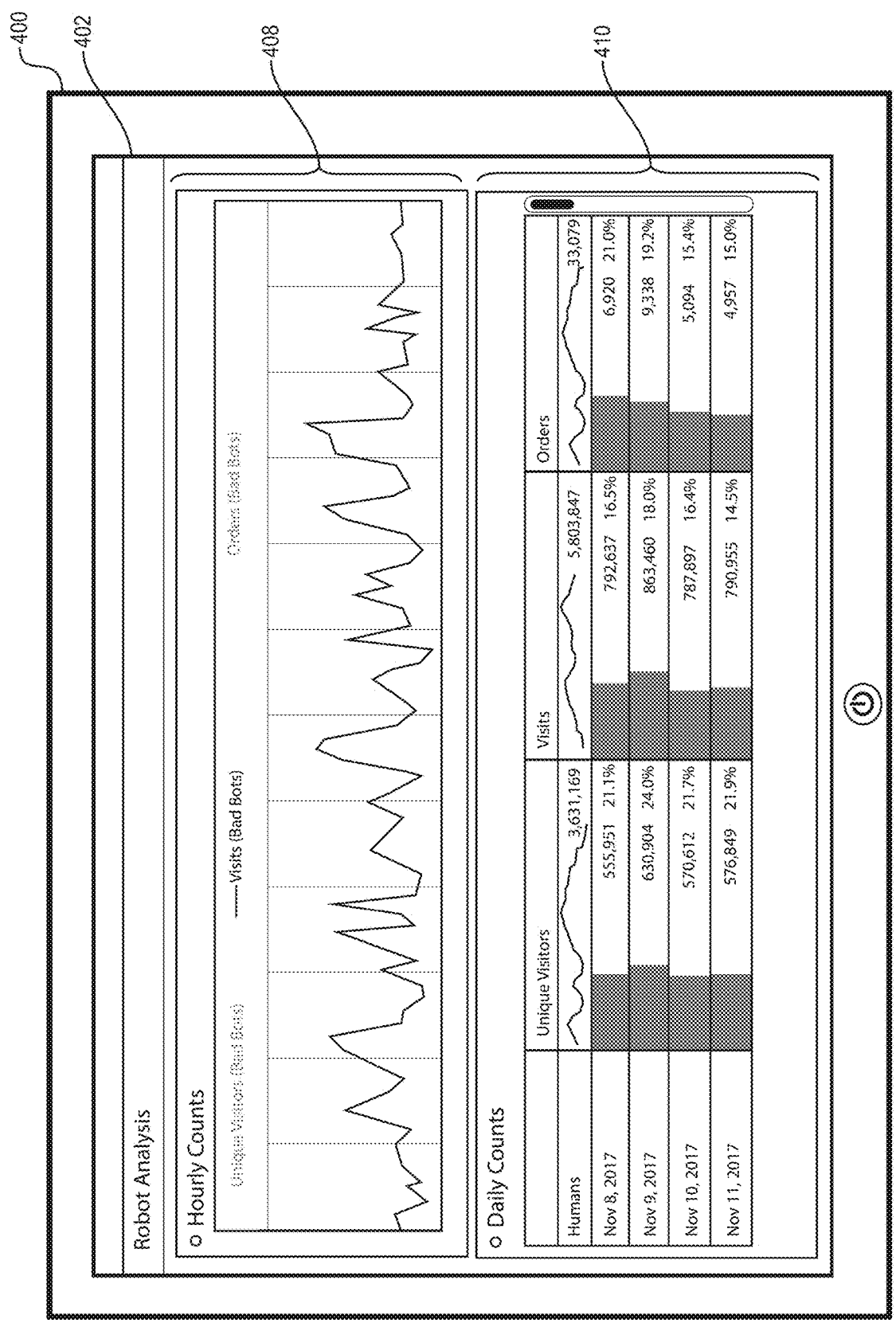
Figure 4C:
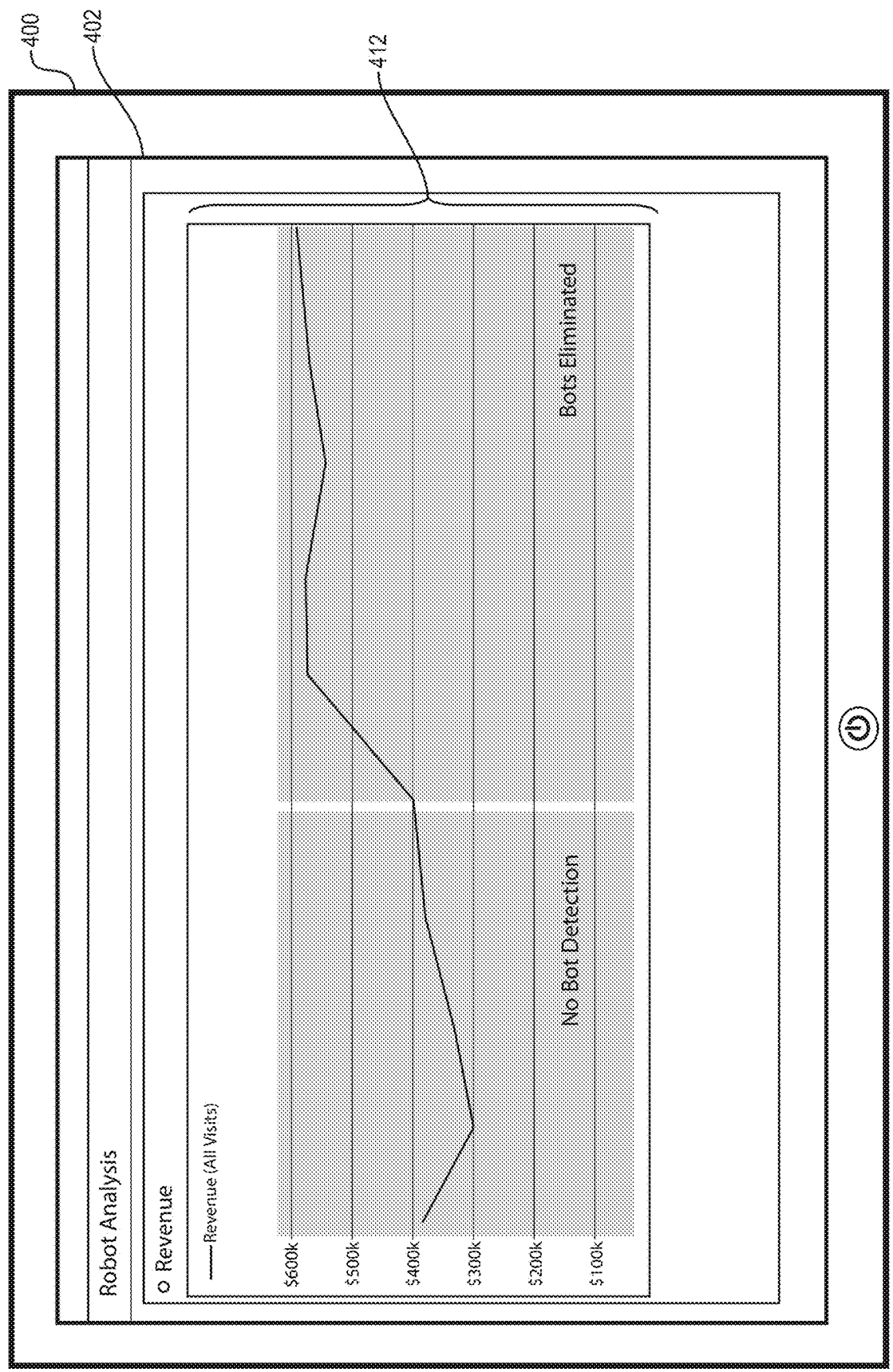

As described previously, the bot detection system 102 can detect robotic activity in online interactions and distinguish robotic activity from human activity. Furthermore, the bot detection system 102 can use this information to generate analytics reports that allow an administrator to view information about session data and also to make modifications to a domain in response to identifying certain types of activity. FIGS. 4A-4C illustrate user interfaces for viewing analytics data associated with a domain and for determining whether to make modifications to one or more portions of a domain. Specifically, the illustrated user interfaces allow one or more users involved with content/data management and/or other positions associated with access to a domain to view human/bot analytics data associated with the domain.

FIG. 4A illustrates an example user interface on an administrator device 400 generated by the bot detection system 102. In one or more embodiments, the administrator device 400 runs an administrator application 402 (e.g., an analytics application) that includes a plurality of different options for viewing analytics for access requests to a domain by a plurality of client devices. In particular, the administrator application 402 can include a plurality of sections that allow the administrator to select and view different aspects of the analytics corresponding to classes (e.g., visitor segments) of network sessions.

To illustrate, the administrator application 402 includes an events section 404 that provides information indicating numbers of events (e.g., network sessions or access requests) at a domain. In one or more embodiments, the events section 404 includes network session data that indicates the number of events of each class of visitor. Specifically, the events section 404 can display the number of detected human visitors, the number of detected good bot visitors, and the number of bad bot visitors as determined by the bot detection system 102. For example, each time the bot detection system 102 detects a network session of a particular class, the bot detection system 102 increments a counter corresponding to the class.

The events section 404 can also display more detailed information associated with network sessions for each class of visitor. For instance, the events section 404 can display a number of unique visitors of each class, the number of total visits for each class, and the number of orders (purchases) by each class. In one example, the events section can provide a comparison of analytics data for each class by displaying the percentage of each class in each category of data. Thus, as illustrated, the administrator can see that human visitors made up almost all of the orders at the domain. Such information indicates that purchase requests are highly indicative of human activity.

The administrator application 402 can also include an hourly section 406 that indicates hourly activity over a specific time range. In particular, the hourly section 406 indicates detailed information associated with a selected class over the specific time range. For example, in response to the administrator selecting to view detailed information for human activity, the counts section 406 displays a timeline of the hourly traffic at the domain by human visitors. Furthermore, the administrator can select a specific point in the timeline to view detailed information about human activity for a time (i.e., an hour) corresponding to the selected marker. To illustrate, if the administrator selects a particular hour of a specific date, the administrator application 402 can display, within the hourly section 406, the number of unique visitors, the number of total visits, and the number of orders by detected human visitors for the selected hour as determined by the bot detection system 102. As illustrated, human activity tends to follow predictable patterns of higher and lower activity corresponding to sleep patterns, certain times of day, etc.

The administrator can also change the information displayed within the hourly section 406 by selecting a different class. For example, as illustrated in FIG. 4B, the administrator can select to view detailed information about bad robotic activity. In response to a selection to view bad robotic activity, the administrator application 402 displays, within an updated hourly section 408, the hourly activity for bad bots over the specific time range as determined by the bot detection system 102. In contrast to human activity shown in FIG. 4A, bad bot activity is sporadic and does not follow predictable patterns. For instance, bad bots request access to domains at any hour of the day. Furthermore, bad bots do not typically request to purchase products, as illustrated in the hourly section 408 of FIG. 4B.

The administrator application 402 can also include a daily section 410 that includes detailed information for visitors of the domain for specific days. To illustrate, the daily section 410 illustrated in FIG. 4B includes trends and other detailed information associated with the selected class for each of the displayed days. The administrator application 402 can display detailed information for a set number of days, a customized number of days, or a dynamic number of days. Additionally, the daily section 410 may update in response to the administrator selecting a different class within the administrator application 402.

FIG. 4C illustrates an interface that includes a graph 412 of revenue corresponding to the domain over time. The graph 412 displays a time range of revenue prior to implementing the domain-agnostic machine-learning techniques described previously, and a time range of revenue after implementing the domain-agnostic machine-learning techniques. As illustrated, the bot detection system 102 significantly improves the revenue for the domain by eliminating or reducing bad robotic activity at the domain using the domain-agnostic machine-learning model. More specifically, reducing the number of bad bots accessing the domain can reduce costs by reducing computing resources needed to handle the additional traffic. Furthermore, the reduced activity of bad bots can also improve revenue for the entity by eliminating the ability of competitors to mine product pricing information and then undercut the prices on their own sites.

The bot detection system 102 can use the processes described herein to detect bad robotic activity and then make modifications to the domain in response to detecting bad robotic activity. Alternatively, once the bot detection system 102 has detected bad robotic activity, the bot detection system 102 can use methods of blocking or otherwise preventing devices associated with the bad robotic activity from accessing the domain (either temporarily or permanently). Thus, the bot detection system 102 can also be useful in reducing the impact of distributed denial of service attacks that rely on repetitive, robotic requests to a domain from many sources.

In one or more embodiments, the bot detection system 102 allows for the detection and also reduction or elimination of bad robotic activity at the domain by changing session requirements at one or more locations of the domain. For instance, the bot detection system 102 can determine that bad bots tend to request access to specific locations more frequently than other locations. The bot detection system 102 can then automatically, or in response to a request by a user, implement authentication requirements for the locations, such as by implementing two-factor authentication, CAPTCHA, reCAPTCHA, or other requirements that prevent bad bots from gaining access to the locations.

Additionally, the bot detection system 102 can automatically generate a notification to provide to the administrator if bad robotic activity for a specific location at the domain exceeds a threshold. For instance, the threshold can be a percentage, such that the bot detection system 102 can notify the administrator if bad robotic activity exceeds the threshold percentage of total activity at the location. Alternatively, the threshold can be a specific number, such that the bot detection system 102 can notify the administrator if bad robotic activity exceeds the threshold number (e.g., total visits) at the location. The administrator can then take action by changing session requirements for the location or indicating to the bot detection system 102 to automatically take action in response to the bad robotic activity meeting the threshold.

In addition to separating human activity from robotic activity (and additionally separating good bots from bad bots), the bot detection system 102 can exclude robotic activity altogether from certain reports. For example, the bot detection system 102 can exclude robotic activity from reports corresponding to revenue. This will allow the entity associated with the domain to obtain more accurate reports for details such as revenue per visitor or return likelihood of a visitor. Excluding robotic activity from such reports eliminates misinformation resulting from robotic activity that skews the results.

In one or more embodiments, the bot detection system 102 also provide the analytics for a domain across multiple applications in a distributed server environment. In particular, the bot detection system 102 can separate analytics for human activity from analytics for robotic activity using the above-described processes. The bot detection system 102 can further separate analytics for good robotic activity from bad robotic activity. The bot detection system 102 can also store the analytics data on one or more servers in the distributed server environment, thereby making the analytics data accessible to a plurality of applications (e.g., in an application suite for the data management platform 120 of FIG. 1).

Furthermore, because the analytics for the human activity is separate from the analytics for the robotic activity, the bot detection system 102 can allow an administrator to use the information about the human activity to inform content creation and content inclusion decisions. Similarly, the separated analytics data allows the administrator to more accurately and easily target human users based on the human activity. Specifically, because the analytics data for the human activity is separate from the analytics data for the robotic activity, the administrator (or entity associated with the administrator) can determine interests and habits of human users with high confidence.

Figure 5:
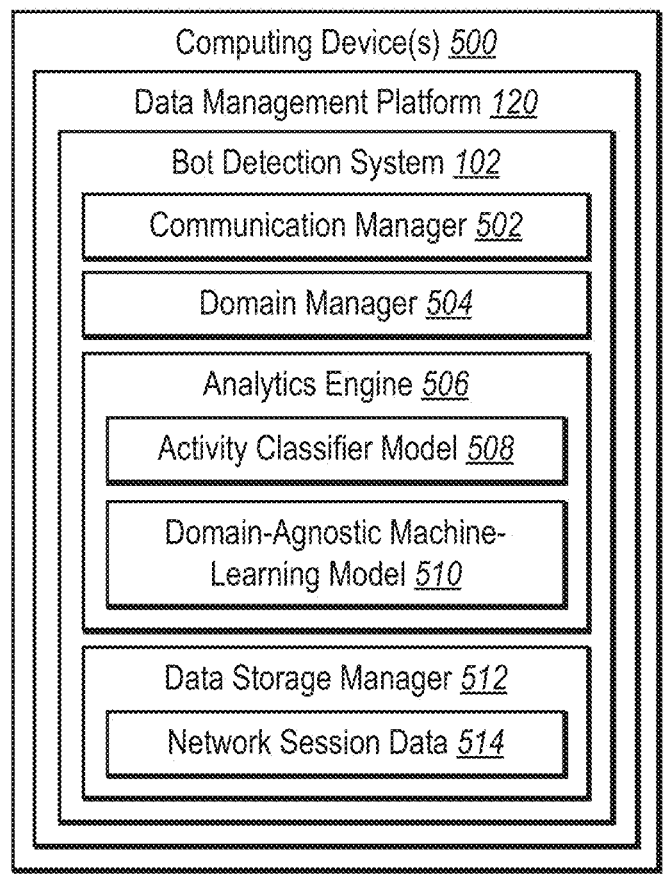
FIG. 5 illustrates a schematic diagram of the bot detection system of FIG. 1 in accordance with one or more implementations.

FIG. 5 illustrates a detailed schematic diagram of an embodiment of the bot detection system 102 of FIG. 1. As shown, the bot detection system 102 can be part of a data management platform 120 on computing device(s) 500. Additionally, the bot detection system 102 can include, but is not limited to, a communication manager 502, a domain manager 504, an analytics engine 506 that includes an activity classifier model 508 and a domain-agnostic machine-learning model 510, and a data storage manager 512. The bot detection system 102 can be implemented on any number of computing devices. For example, the bot detection system 102 can be implemented in a distributed system of server devices for detecting and managing Internet activity for a plurality of domains associated with a plurality of entities. Alternatively, the bot detection system 102 can be implemented on a single computing device, such as a single server device in communication with a plurality of different devices.

In one or more embodiments, each of the components of the bot detection system 102 are in communication with one another using any suitable communication technologies. Additionally, the components of the bot detection system 102 can be in communication with one or more other devices including the administrator device 112 at domain 106a, one or more devices at domain 106b, and client devices 108a, 108b. It will be recognized that although the components of the bot detection system 102 are shown to be separate in FIG. 5, any of the subcomponents may be combined into fewer components, such as into a single component, or divided into more components as may serve a particular implementation. Furthermore, although the components of FIG. 5 are described in connection with the bot detection system 102, at least some of the components for performing operations in conjunction with the bot detection system 102 described herein may be implemented on other devices within the environment.

The components of the bot detection system 102 can include software, hardware, or both. For example, the components of the bot detection system 102 can include one or more instructions stored on a computer-readable storage medium and executable by processors of one or more computing devices (e.g., the computing device(s) 500). When executed by the one or more processors, the computer-executable instructions of the bot detection system 102 can cause the computing device(s) 500 to perform the Internet activity detection and recognition methods described herein. Alternatively, the components of the bot detection system 102 can comprise hardware, such as a special purpose processing device to perform a certain function or group of functions. Additionally, or alternatively, the components of the bot detection system 102 can include a combination of computer-executable instructions and hardware.

Furthermore, the components of the bot detection system 102 performing the functions described herein with respect to the bot detection system 102 may, for example, be implemented as part of a stand-alone application, as a module of an application, as a plug-in for applications including marketing applications, as a library function or functions that may be called by other applications, and/or as a cloud-computing model. Thus, the components of the bot detection system 102 may be implemented as part of a stand-alone application on a personal computing device or a mobile device. Alternatively, or additionally, the components of the bot detection system 102 may be implemented in any application that allows campaign and content management, including, but not limited to, applications in ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE", "ADOBE ANALYTICS CLOUD", "ADOBE ANALYTICS", "ADOBE AUDIENCE MANAGER", "ADOBE CAMPAIGN", "ADOBE EXPERIENCE MANAGER", and "ADOBE TARGET" are registered trademarks of Adobe Systems Incorporated in the United States and/or other countries.

As mentioned, the bot detection system 102 includes a communication manager 502 to facilitate the management of communications with one or more external devices. For example, the communication manager 502 can allow the bot detection system 102 to communicate with other devices associated with domains (e.g., administrator device 112 of FIG. 1), devices attempting to access domains (e.g., client devices 108a, 108b), content databases, or other devices or systems. The communication manager 502 can thus allow the bot detection system 102 to receive and provide data in connection with detecting and identifying activity in connection with devices accessing a plurality of domains, and for providing analytics data associated with the activity to administrators of domains.

The bot detection system 102 also includes a domain manager 504 to facilitate the management of a plurality of domains in communication with the bot detection system 102. Specifically, the domain manager 504 manages information about the domains that allows the bot detection system 102 to identify the domains. Furthermore, the domain manager 504 can manage (e.g., monitor/track) traffic for each of the domains by determining information (e.g., cookies or other session identifiers) associated with network sessions corresponding to attempts to access the domains. The domain manager 504 can also manage access to the bot detection system 102 by administrators of the bot detection system 102, for example, by managing permissions and/or login information for the administrators.

The bot detection system 102 further includes an analytics engine 506 to analyze and process data collected for a plurality of domains. For instance, the analytics engine 506 can communicate with the domain manager 504 to obtain information that the domain manager 504 collects while monitoring access to the domains. The analytics engine 506 can then process the information for a plurality of domains using a plurality of machine-learning models. In particular, the analytics engine 506 includes an activity classifier model 508 and a domain-agnostic machine-learning model 510.

In one or more embodiments, the analytics engine 506 includes at least one activity classifier model 508. The activity classifier model 508 includes a machine-learning model corresponding to a domain that allows the analytics engine 506 to analyze network session data for the domain for detecting human activity and robotic activity. The activity classifier model 508 can process historical network session data for the domain to determine identities of new network sessions for the domain. In at least some embodiments, the activity classifier model 508 classifies human activity and robotic activity at the domain. In additional embodiments, the activity classifier model 508 further classifies good robotic activity and bad robotic activity. The analytics engine 506 includes an activity classifier model 508 for each domain analyzed.

The analytics engine 506 also includes a domain-agnostic machine-learning model 510 for classifying network sessions across a plurality of domains. Specifically, the analytics engine 506 can generate the domain-agnostic machine-learning model 510 from a plurality of activity classifier models 508 from a plurality of domains. For instance, the analytics engine 506 can use activity classifier models 508 for a plurality of domains with high-quality network session data to generate the domain-agnostic machine-learning model 510. Thus, the analytics engine 506 can verify that the domain-agnostic machine-learning model 510 is trained using labeled session data corresponding to human activity, which allows the domain-agnostic machine-learning model to learn features for identifying human activity in new network sessions across domains.

The bot detection system 102 also includes a data storage manager 512 (that comprises a non-transitory computer memory) that stores and maintains data associated with detecting human activity and robotic activity across a plurality of domains. For example, the data storage manager 512 can include a database that stores network session data 514 for a plurality of domains. Additionally, the data storage manager 512 can store information associated with recipients of campaign content including response data from the recipients for different parameters of a digital campaign.

Figure 6:
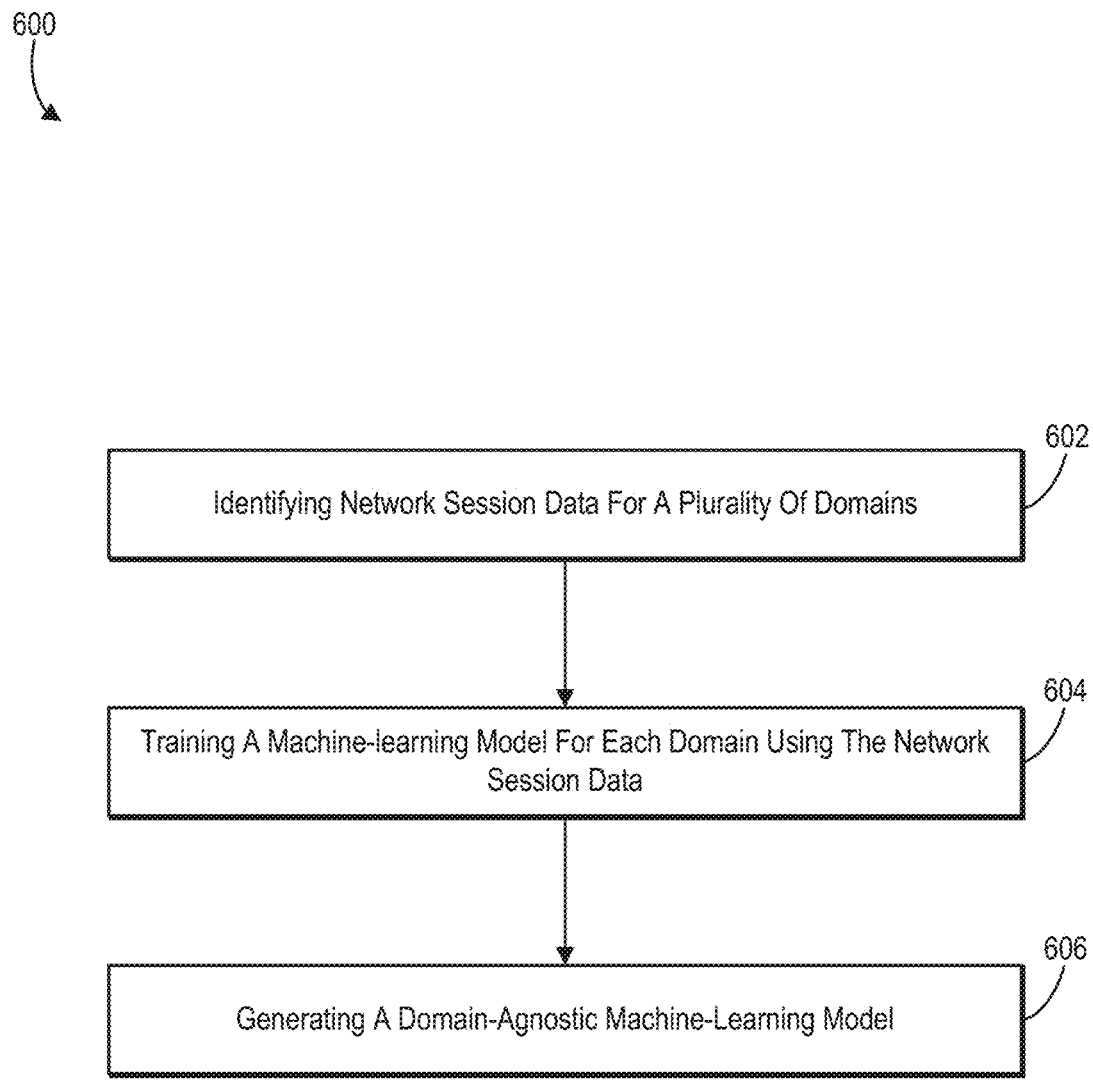
FIG. 6 illustrates a flowchart of a series of acts in a method of detecting robotic activity in accordance with one or more implementations.

Turning now to FIG. 6, this figure illustrates a flowchart of a series of acts 600 of detecting robotic activity while monitoring Internet traffic. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6.

The series of acts 600 includes an act 602 of identifying network session data for a plurality of domains. For example, act 602 involves identifying network session data for a plurality of domains, the network session data for each domain of the plurality of domains comprising a plurality of network sessions including features that indicate human activity. Act 602 can involve obtaining historical network session data for each domain of the plurality of domains, wherein the historical network session data includes a plurality of network sessions corresponding to human activity and a plurality of network sessions corresponding to robotic activity. Act 602 can also involve labeling the plurality of network sessions including features that indicate human activity as human activity.

The features that indicate human activity can include login sessions that verify human activity. For example, the login sessions can verify human activity by using two-factor or multi-factor authentication. Alternatively, the features that indicate human activity can include interactions with a domain that involve a product purchase.

The series of acts 600 also includes an act 604 of training a machine-learning model for each domain using the network session data. For example, act 604 involves training a machine-learning model for each domain of the plurality of domains, using the network session data for the domain, to output a probability that a given network session at the domain corresponds to human activity given a set of features for the given network session.

The series of acts 600 further includes an act 606 of generating a domain-agnostic machine-learning model. For example, act 606 involves generating a domain-agnostic machine-learning model by combining the plurality of machine-learning models for the plurality of domains, wherein the domain-agnostic machine-learning model, given a set of features for a network session irrespective of a domain, determines whether the network session corresponds to human activity or robotic activity. Act 606 can involve using domain adaptation to combine the plurality of machine-learning models for the plurality of domains.

The series of acts 600 can include an act of identifying a network session at a domain not in the plurality of domains. In one or more embodiments, the domain not in the plurality of domains uses login requirements that do not verify human activity. The series of acts 600 can also include an act of determining a plurality of features of the new network session. The series of acts 600 can also include an act of determining, by inputting the plurality of features of the new network session to the domain-agnostic machine-learning model, that the new network session at the domain not in the plurality of domains corresponds to human activity. For example, determining that the new network session at the domain not in the plurality of domains corresponds to human activity can involve generating, for the new network session and based on the plurality of features of the new network session, a humanness score indicating a probability of the new network session corresponding to human activity. Determining that the new network session at the domain not in the plurality of domains corresponds to human activity can also involve determining that the new network session corresponds to human activity in response to determining that the humanness score meets a threshold.

The series of acts 600 can include an act of determining that an amount of network session traffic at a webpage of a website corresponding to a domain meets a predetermined threshold amount of robotic activity. The series of acts 600 can also include an act of modifying, in response to determining that the amount of network session traffic meets the predetermined threshold, a session connection of the webpage to verify human activity.

The series of acts 600 can further include an act of analyzing, using the domain-agnostic machine-learning model, a plurality of new network sessions for a domain to determine a first subset of new network sessions corresponding to human activity and a second subset of new network sessions corresponding to robotic activity. The series of acts 600 can also include an act of generating an analytics report including the first subset of new network sessions and excluding the second subset of new network sessions.

Additionally, the series of acts 600 can further include an act of analyzing, using the domain-agnostic machine-learning model, a plurality of new network sessions for a domain to determine a first subset of new network sessions corresponding to human activity and a second subset of new network sessions corresponding to robotic activity. The series of acts 600 can also include an act of generating an analytics report including the first subset of new network sessions and excluding the second subset of new network sessions. The series of acts 600 further includes an act of providing, to an administrator client device, the analytics report including the first subset of new network sessions.

Figure 7:
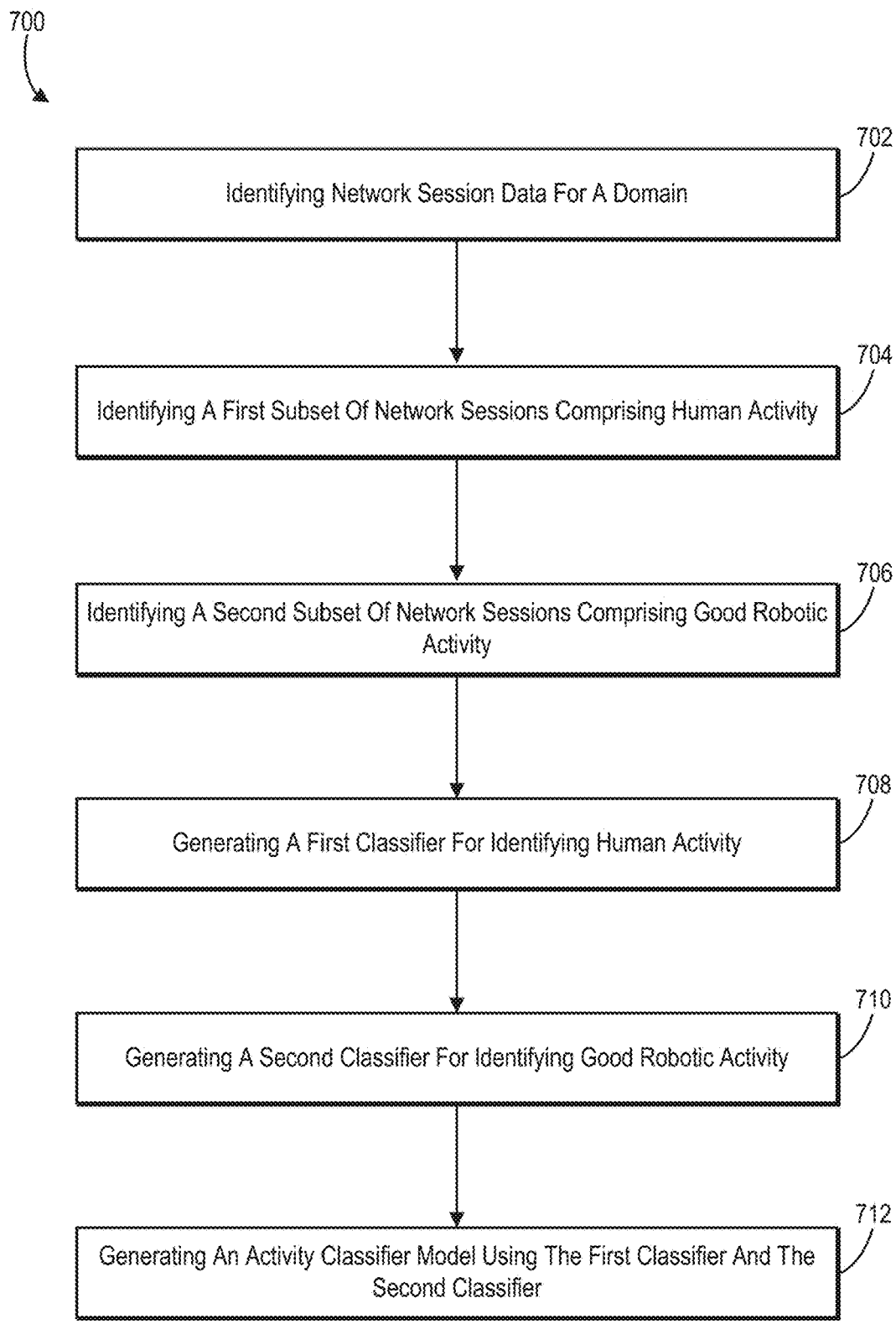
FIG. 7 illustrates a flowchart of a series of acts in another method of detecting robotic activity in accordance with one or more implementations.

Turning now to FIG. 7, this figure illustrates a flowchart of a series of acts 700 of detecting robotic activity while monitoring Internet traffic. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

The series of acts 700 includes an act 702 of identifying network session data for a domain. For example, act 702 involves identify network session data for a domain, the network session data comprising a plurality of network sessions.

The series of acts 700 also includes an act 704 of identifying a first subset of network sessions comprising human activity. For example, act 704 involves identifying, from the plurality of network sessions, a first subset of network sessions comprising human activity. Act 704 can involve labeling the first subset of network sessions comprising human activity as network sessions that correspond to human activity.

The series of acts 700 additionally includes an act 706 of identifying a second subset of network sessions comprising good robotic activity. For example, act 706 involves identifying, from the plurality of network sessions, a second subset of network sessions comprising good robotic activity. Act 706 can involve labeling the second subset of network sessions comprising good robotic activity as network sessions that correspond to good robotic activity.

The series of acts 700 also includes an act 708 of generating a first classifier for identifying human activity. For example, act 708 involves generating, using the first subset of network sessions, a first classifier to output a probability that a network session at the domain corresponds to human activity given a set of features for the network session. Act 708 can involve generating the first classifier to output the probability that the network session at the domain corresponds to good robotic activity based on whether the network session corresponds to an interaction comprising a purchase via the domain or a two-factor authentication session at the domain.

Additionally, the series of acts 700 includes an act 710 of generating a second classifier for identifying good robotic activity. For example, act 710 involves generating, using the second subset of network sessions, a second classifier to output a probability that the network session at the domain corresponds to good robotic activity given the set of features for the network session. Act 710 can involve generating the second classifier to output the probability that the network session at the domain corresponds to good robotic activity based on a session length of the network session.

The series of acts 700 also includes an act 712 of generating an activity classifier model using the first classifier and the second classifier. For example, act 712 involves generating, using the first classifier and the second classifier, an activity classifier model that determines whether network sessions at the domain correspond to human activity, good robotic activity, or bad robotic activity.

The series of acts 700 can include an act of identifying a new network session at the domain. The series of acts 700 can include an act of determining a plurality of features of the new network session. The series of acts 700 can then include an act of determining, using the activity classifier model, whether the new network session corresponds to human activity, good robotic activity, or bad robotic activity given a set of features for the new network session.

The series of acts 700 can also include an act of determining a threshold session length as a value corresponding to a third quartile value in a distribution of session lengths of historical good robotic activity for the domain.

The series of acts 700 can additionally include an act of identifying a new network session at the domain. The series of acts 700 can include an act of applying the first classifier and the second classifier of the activity classifier model to the new network session. The series of acts can then include determining that the new network session corresponds to human activity, good robotic activity, or bad robotic activity based on an output of the first classifier and an output of the second classifier.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
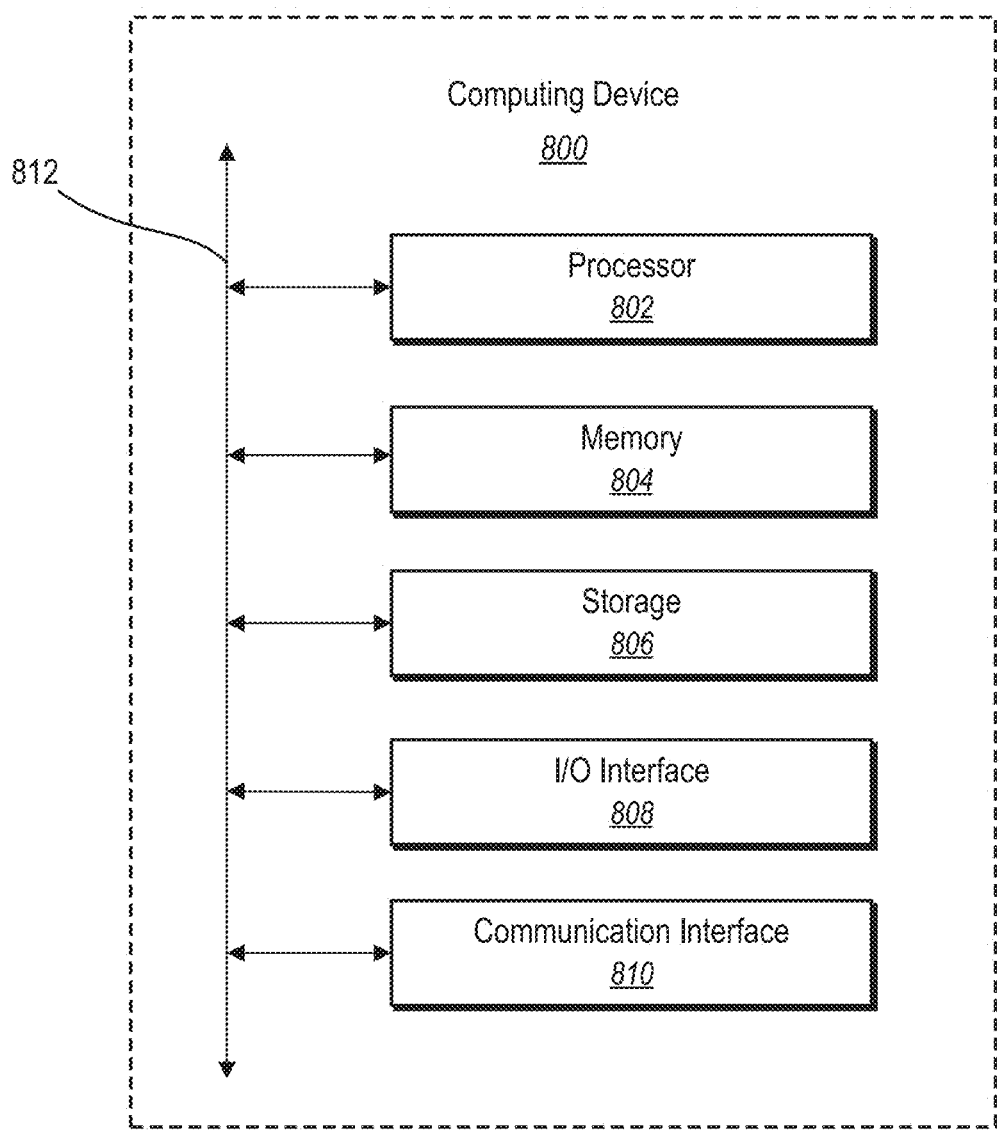
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the bot detection system 102. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computer system to:
    access a plurality of machine-learning models for a plurality of domains, a machine-learning model of the plurality of machine-learning models trained to output a probability that a given network session at the domain corresponds to human activity given a set of features for the given network session; and
    generate a domain-agnostic machine-learning model by combining the plurality of machine-learning models for the plurality of domains, wherein the domain-agnostic machine-learning model, given a set of features for a network session irrespective of a domain, determines whether the network session corresponds to human activity or robotic activity.

2. The non-transitory computer readable storage medium as recited in claim 1, wherein the instructions that cause the computer system to generate the domain-agnostic machine-learning model further cause the computer system to use domain adaptation to combine the plurality of machine-learning models for the plurality of domains.

3. The non-transitory computer readable storage medium as recited in claim 1, wherein the features that indicate human activity comprise indications of login sessions with multi-factor authentication requirements.

4. The non-transitory computer readable storage medium as recited in claim 1, wherein a plurality of network sessions comprises product purchases at the plurality of domains.

5. The non-transitory computer readable storage medium as recited in claim 1, further comprising instructions that, when executed by the at least one processor, cause the computer system to:
    determine that an amount of network session traffic at a webpage of a website meets a predetermined threshold amount of robotic activity; and
    modify, in response to determining that the amount of network session traffic meets the predetermined threshold, a session connection of the webpage to verify human activity.

6. The non-transitory computer readable storage medium as recited in claim 1, further comprising instructions that, when executed by the at least one processor, cause the computer system to:
    analyze, using the domain-agnostic machine-learning model, a plurality of new network sessions to determine a first subset of new network sessions corresponding to human activity and a second subset of new network sessions corresponding to robotic activity;
    analyze the second subset of new network sessions to determine whether the new network sessions include good robotic activity or bad robotic activity; and
    generate an analytics report including the first subset of new network sessions and excluding the second subset of new network sessions.

7. The non-transitory computer readable storage medium as recited in claim 1, wherein the instructions that cause the computer system to access a plurality of machine-learning models for a plurality of domains cause the computer system to train the machine-learning model of the plurality of machine-learning models using network session data for the domain, the network session data for the domain comprising a plurality of network sessions including features that indicate human activity.

8. The non-transitory computer readable storage medium as recited in claim 1, further comprising instructions that, when executed by the at least one processor, cause the computer system to:
    identify a new network session at a domain not in the plurality of domains;
    determine a plurality of features of the new network session; and
    determine, by inputting the plurality of features of the new network session to the domain-agnostic machine-learning model, that the new network session corresponds to human activity.

9. The non-transitory computer readable storage medium as recited in claim 8, wherein the instructions that cause the computer system to determine that the new network session at the domain not in the plurality of domains corresponds to human activity further cause the computer system to:
    generate, for the new network session and based on the plurality of features of the new network session, a humanness score indicating a probability of the new network session corresponding to human activity; and
    determine that the new network session corresponds to human activity in response to determining that the humanness score meets a threshold.

10. The non-transitory computer readable storage medium as recited in claim 8, wherein the domain not in the plurality of domains uses login requirements that do not verify human activity.

* * * * *